(12) United States Patent
Choi et al.

(10) Patent No.: US 12,238,704 B2
(45) Date of Patent: *Feb. 25, 2025

(54) METHOD AND DEVICE FOR SUPPORTING LATENCY SERVICES VIA A LOGICAL CHANNEL IN A MOBILE COMMUNICATION SYSTEM

(71) Applicant: SAMSUNG ELECTRONICS CO., LTD., Suwon-si (KR)

(72) Inventors: Seunghoon Choi, Seongnam-si (KR); Yongjun Kwak, Yongin-si (KR); Younsun Kim, Seongnam-si (KR); Taehyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,404

(22) Filed: Sep. 18, 2023

(65) Prior Publication Data

US 2024/0008032 A1    Jan. 4, 2024

Related U.S. Application Data

(63) Continuation of application No. 17/818,261, filed on Aug. 8, 2022, now Pat. No. 11,765,714, which is a
(Continued)

(30) Foreign Application Priority Data

Nov. 3, 2016    (KR) .................. 10-2016-0145931
Dec. 22, 2016    (KR) .................. 10-2016-0177057
(Continued)

(51) Int. Cl.
H04W 72/1263    (2023.01)
H04L 5/14    (2006.01)
(Continued)

(52) U.S. Cl.
CPC ....... *H04W 72/1263* (2013.01); *H04L 5/1469* (2013.01); *H04W 56/001* (2013.01);
(Continued)

(58) Field of Classification Search
CPC ......... H04W 72/1263; H04W 72/0453; H04W 72/1289; H04W 80/02; H04W 72/046;
(Continued)

(56) References Cited

U.S. PATENT DOCUMENTS

2012/0300681 A1    11/2012    Ji et al.
2013/0003672 A1*    1/2013    Dinan .................. H04L 5/0025
                                                                    370/329
(Continued)

FOREIGN PATENT DOCUMENTS

CN            103748816 A        4/2014
KR    10-2016-0058692 A        5/2016
(Continued)

OTHER PUBLICATIONS

International Search Report dated Feb. 2, 2018 in connection with International Patent Application No. PCT/KR2017/012330, 2 pages.
(Continued)

*Primary Examiner* — Mewale A Ambaye

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention suggests a method for transmitting and receiving signals satisfying a maximum delay
(Continued)

time, and a method and a device for effectively processing signals that are influenced by the transmission and reception of the signals satisfying the maximum delay time.

20 Claims, 17 Drawing Sheets

Related U.S. Application Data continuation of application No. 16/347,546, filed as application No. PCT/KR2017/012330 on Nov. 2, 2017, now Pat. No. 11,412,528.

(30) Foreign Application Priority Data

| Feb. 9, 2017 | (KR) | 10-2017-0018195 |
|---|---|---|
| Apr. 24, 2017 | (KR) | 10-2017-0052467 |

(51) Int. Cl.
| | |
|---|---|
| H04W 56/00 | (2009.01) |
| H04W 72/0453 | (2023.01) |
| H04W 72/1268 | (2023.01) |
| H04W 72/23 | (2023.01) |
| H04W 74/0833 | (2024.01) |
| H04W 80/02 | (2009.01) |

(52) U.S. Cl.
CPC ... *H04W 72/0453* (2013.01); *H04W 72/1268* (2013.01); *H04W 72/23* (2023.01); *H04W 74/0833* (2013.01); *H04W 80/02* (2013.01)

(58) Field of Classification Search
CPC ........ H04W 16/28; H04W 72/14; H04B 7/15; H04L 12/1818; H04L 63/0442; H04L 63/0457; H04L 65/1069
See application file for complete search history.

(56) References Cited

U.S. PATENT DOCUMENTS

| 2013/0336299 | A1 | 12/2013 | Lee et al. | |
|---|---|---|---|---|
| 2014/0376427 | A1 | 12/2014 | Hui et al. | |
| 2015/0124598 | A1 | 5/2015 | Jang et al. | |
| 2015/0143456 | A1 | 5/2015 | Raleigh et al. | |
| 2016/0143008 | A1 | 5/2016 | Lee et al. | |
| 2017/0331577 | A1 | 11/2017 | Parkvall et al. | |
| 2018/0048375 | A1 | 2/2018 | Guo et al. | |
| 2018/0084560 | A1 | 3/2018 | Cho et al. | |
| 2018/0270699 | A1* | 9/2018 | Babaei | H04W 28/0278 |
| 2018/0270700 | A1* | 9/2018 | Babaei | H04W 28/0278 |
| 2018/0368133 | A1 | 12/2018 | Park et al. | |
| 2019/0350045 | A1 | 11/2019 | Lee et al. | |
| 2020/0252980 | A1 | 8/2020 | Anand et al. | |

FOREIGN PATENT DOCUMENTS

| WO | 2012/128490 A2 | 9/2012 |
|---|---|---|
| WO | 2013/172618 A1 | 11/2013 |
| WO | 2016/148357 A1 | 9/2016 |

OTHER PUBLICATIONS

Written Opinion of the International Searching Authority dated Feb. 2, 2018 in connection with International Patent Application No. PCT/KR2017/012330, 8 pages.

Samsung, "Enhancement of LCP for Supporting Multiple Numerologies in NR", 3GPP TSG RAN WG2 #95bis, Oct. 10-14, 2016, R2-166469, 6 pages.

Huawei, HiSilicon, "Scheduling for URLLC", 3GPP TSG-RAN WG2 Meeting #96, Nov. 14-18, 2016, R2-168459, 5 pages.

Supplementary European Search Report dated Sep. 17, 2019 in connection with European Patent Application No. 17 86 7711, 7 pages.

* cited by examiner

METHOD AND DEVICE FOR SUPPORTING LATENCY SERVICES VIA A LOGICAL CHANNEL IN A MOBILE COMMUNICATION SYSTEM

CROSS-REFERENCE TO RELATED APPLICATIONS

This application is a continuation of Ser. No. 17/818,261 filed Aug. 8, 2022, now U.S. Pat. No. 11,765,714 issued Sep. 19, 2023, which is a continuation of Ser. No. 16/347,546 filed May 3, 2019, now U.S. Pat. No. 11,412,528 issued Aug. 9, 2022, which is a 371 of International Application No. PCT/KR2017/012330 filed on Nov. 2, 2017, which claims priority to Korean Patent Application No. 10-2016-0145931 filed on Nov. 3, 2016, Korean Patent Application No. 10-2016-0177057 filed on Dec. 22, 2016, Korean Patent Application No. 10-2017-0018195 filed on Feb. 9, 2017, and Korean Patent Application No. 10-2017-0052467 filed on Apr. 24, 2017, the disclosures of which are herein incorporated by reference in their entirety.

BACKGROUND

1. Field

The disclosure relates to a wireless communication system, and more particularly, to a method and a device by which, in the case where different wireless communication systems coexist in one carrier frequency or a plurality of carrier frequencies, a terminal, which is able to transmit/receive data in at least one of the different communication systems, transmits/receives data to/from the respective communication systems.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Various kinds of services provided by the 5G communication systems are being studied, and one of them is a service satisfying a low-latency requirement.

In particular, a time division duplex (TDD) system requires a method for satisfying a maximum latency time. More specifically, the disclosure provides a method of classifying subframes into a plurality of types of subframes in a TDD system, considering a specific type of subframe, among the respective types of subframes, as a subframe that can dynamically switch to an uplink/downlink subframe as to the type thereof, and providing data transmission and reception so as not to exceed a maximum latency time, and a device according thereto. In addition, the disclosure provides a method of allocating resources for beyond-5G services to be provided in the future using the dynamically uplink/downlink-switching subframes and subframes in a frequency division duplex (FDD) and a device according thereto. Furthermore, the disclosure provides a method of processing transmission signals of an enhanced mobile broadband (eMBB) terminal, which were previously configured or indicated, when the subframes of a TDD system dynamically switch to uplink/downlink subframes by the support of ultra-reliable and low-latency communications (URLLC) and a device thereof.

SUMMARY

In order to solve the problems described above, the disclosure provides a method for a terminal to transmit a signal, which includes: receiving first service configuration information from a base station; transmitting, to the base station, information indicating that a first service signal is to be transmitted; and transmitting the first service signal to the base station in a first slot according to the first service signal transmission indication information, wherein the first service is a low-latency service. In addition, the method may further include: receiving first service resource information from the base station; and identifying that the first slot has switched from a downlink to an uplink on the basis of the first service resource information. In addition, the method may further include: receiving a downlink reception indication signal from the base station; and determining whether or not to perform a downlink second service signal reception operation in the first slot on the basis of the downlink reception indication signal. In addition, the first service signal transmission indication information may be transmitted using a resource different from a scheduling request of the terminal, and the first service signal may be identified by a logical channel ID different from a second service signal.

In addition, a method for a base station to receive a signal may include: transmitting first service configuration information to a terminal; receiving, from the terminal, information indicating that the first service signal is to be transmitted; and receiving the first service signal from the terminal in a first slot according to the first service signal transmission indication information, wherein the first service is a low-latency service.

In addition, a terminal for transmitting a signal may include: a transceiver configured to transmit and receive signals; and a controller configured to perform control so as to receive first service configuration information from a base station, so as to transmit, to the base station, information indicating that the first service signal is to be transmitted, and so as to transmit the first service signal to the base station in a first slot according to the first service signal transmission indication information, wherein the first service is a low-latency service.

In addition, a base station for receiving a signal may include: a transceiver configured to transmit and receive signals; and a controller configured to perform control so as to transmit first service configuration information to a terminal, so as to receive, from the terminal, information indicating that the first service signal is to be transmitted, and so as to receive the first service signal from the terminal in a first slot according to the first service signal transmission indication information, wherein the first service is a low-latency service.

According to the disclosure, it is possible to transmit and receive signals while satisfying a maximum latency time in a 5G TDD system and to effectively process signals influenced by transmission and reception of signals satisfying a maximum latency time. Various other effects will be directly or implicitly disclosed in the detailed description according to the embodiments of the disclosure to be described below.

DETAILED DESCRIPTION

Figure 1:
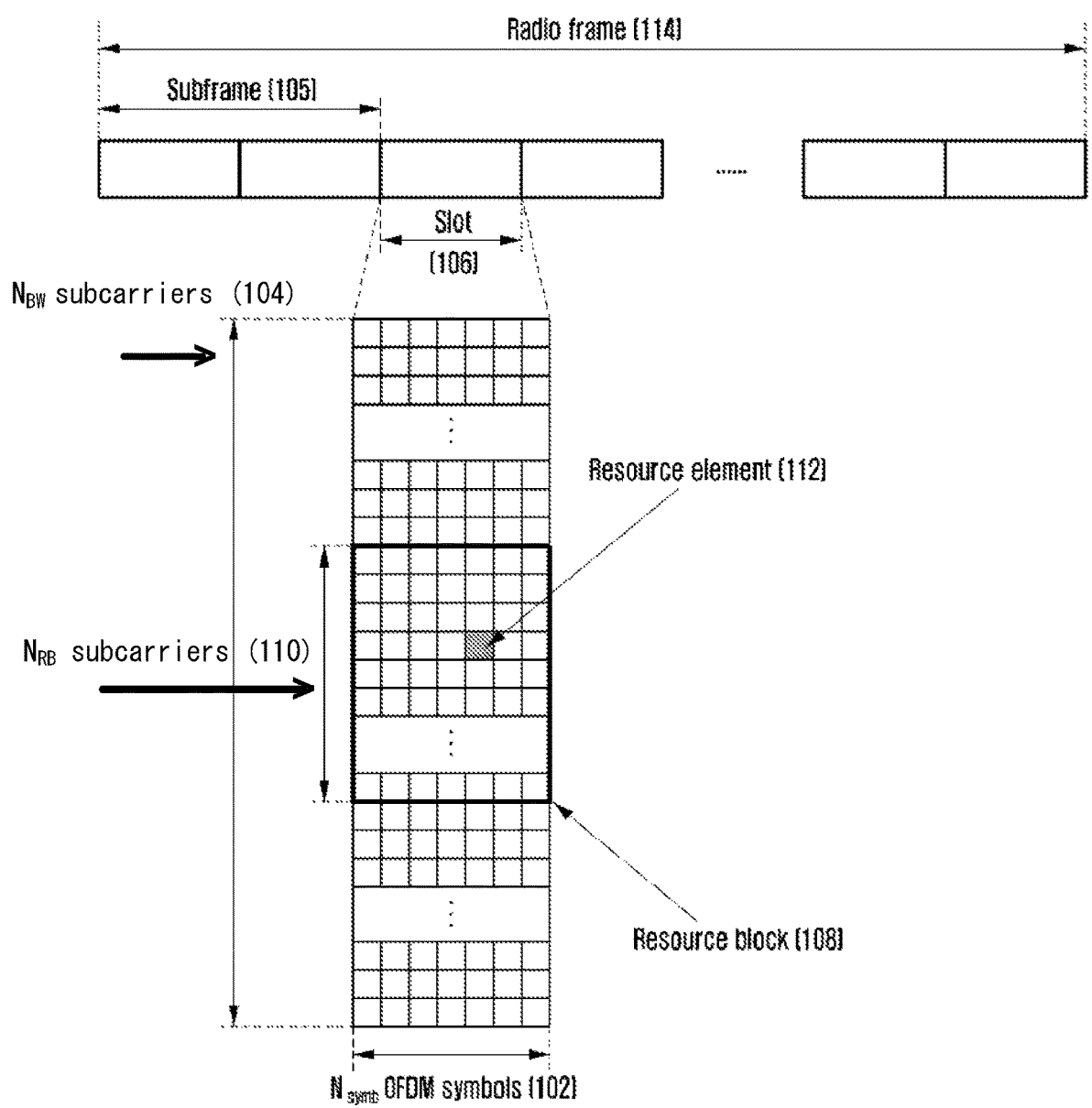
FIG. 1 is a diagram illustrating the fundamental structure of a time-frequency domain in an LTE system.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card. Also, in an embodiment, "unit" may include one or more processors.

In general, a mobile communication system has been developed to provide voice services while ensuring the mobility of a user. The mobile communication system is gradually expanding to data services, as well as voice services, and at present has been developed to the extent of providing high-speed data services. However, the mobile communication system currently providing services has a shortage of resources, and a more advanced mobile communication system is required in order to meet user demand for higher-speed services.

As one of the next-generation mobile communication systems under development in response to the above demands, the standardization of long-term evolution (LTE) is underway in the $3^{rd}$ generation partnership project (3GPP). LTE is a technology that implements high-speed packet-based communications with a transmission rate of up to 100 Mbps. To this end, various methods are under discussion. For example, a method of reducing the number of nodes located on communication paths by simplifying the structure of a network, a method of allowing wireless protocols to approximate wireless channels as much as possible, and the like have been provided.

The LTE system adopts a hybrid automatic repeat request (HARQ) scheme in which a physical layer resends corresponding data in the case of a decoding failure in initial transmission. The HARQ scheme is a technique in which a receiver transmits, to a transmitter, a negative acknowledgment (NACK) indicating decoding failure if the receiver fails to correctly decode the data, thereby enabling the transmitter to retransmit the corresponding data in a physical layer. The receiver combines data retransmitted by the transmitter with the data for which decoding previously failed, thereby improving data reception performance. In addition, if the receiver correctly decodes the data, the receiver may transmit, to the transmitter, an acknowledgment (ACK) indicating the success of decoding so that the transmitter may transmit new data.

FIG. 1 is a diagram illustrating the fundamental structure of a time-frequency domain, which is a radio resource domain in which data or a control channel is transmitted in a downlink in an LTE system.

In FIG. 1, the horizontal axis denotes a time domain, and the vertical axis denotes a frequency domain. The minimum transmission unit in the time domain is an OFDM symbol. $N_{symb}$ OFDM symbols 102 constitute one slot 106, and two slots constitute one subframe 105. The slot has a length of 0.5 ms, and the subframe has a length of 1.0 ms. In addition, the radio frame 114 is a time domain unit including 10 subframes. The minimum transmission unit in the frequency domain is a subcarrier, and the entire system transmission bandwidth includes a total of $N_{BW}$ subcarriers 104.

The basic resource unit in the time-frequency domain is a resource element (RE) 112, which may be indicated by an OFDM symbol index and a subcarrier index. A resource block (RB) {or physical resource block (PRB)} 108 is defined by consecutive $N_{symb}$ OFDM symbols 102 in the time domain and consecutive $N_{RB}$ subcarriers 110 in the frequency domain. Thus, one RB 108 includes $N_{symb} \times N_{RB}$ REs 112. In general, the minimum transmission unit of data is the RB unit. In the LTE system, $N_{symb}=7$ and $N_{RB}=12$, and $N_{BW}$ is proportional to the bandwidth of the system transmission band.

The data rate increases in proportion to the number of RBs scheduled to the terminal. Six transmission bandwidths are defined to be operated in the LTE system. In the case of an FDD system in which a downlink and an uplink are classified by frequency to be operated, the downlink transmission bandwidth and the uplink transmission bandwidth may be different from each other. A channel bandwidth refers to an RF bandwidth corresponding to the system transmission bandwidth. Table 1 below shows the relationship between the system transmission bandwidth and the channel bandwidth defined to correspond to each other in the LTE system. For example, an LTE system with a channel bandwidth of 10 MHz has a transmission bandwidth including 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Downlink control information is transmitted using the first N OFDM symbols in the subframe. In general, N={1, 2, and 3}. Therefore, the value of N for each subframe varies with the amount of control information to be transmitted in the current subframe. The control information includes a control channel transmission interval indicator indicating the number of OFDM symbols provided for transmission of the control information, scheduling information for downlink data or uplink data, an HARQ ACK/NACK signal, and the like.

In the LTE system, scheduling information for downlink data or uplink data is transmitted from a base station to a terminal through downlink control information (DCI). Uplink (UL) refers to a radio link through which the terminal transmits data or a control signal to the base station, and downlink (DL) refers to a radio link through which the base station transmits data or control signals to the terminal.

The DCI is defined as various kinds of formats, and a DCI format is applied and operated, and is determined according to the scheduling information (UL grant) for uplink data or the scheduling information (DL grant or DL assignment) for downlink data, according to whether or not the control information is compact DCI (compact DCI) having a small size, according to whether or not spatial multiplexing using multiple antennas is applied, or according to whether or not the DCI is intended for power control. For example, DCI format 1, which is the scheduling control information for downlink data, is configured to include at least the following control information.

Resource allocation type 0/1 flag: this notifies of resource allocation type 0 or 1. Type allocates resources by a resource block group (RBG) while applying a bitmap scheme. In the LTE system, the basic unit of scheduling is an RB indicated by time and frequency domain resources, and the RBG includes a plurality of RBs and becomes a basic unit of scheduling in type 0. Type 1 allocates a specific RB in the RBG.

Resource block assignment: this notifies of the RBs allocated for data transmission. The resources to be expressed are determined according to a system bandwidth and a resource allocation scheme.

Modulation and coding scheme (MCS): this notifies of a modulation scheme used for data transmission and the size of a transport block, which is the data to be transmitted.

HARQ process number: this notifies of the HARQ process number.

New data indicator: this notifies of HARQ initial transmission or retransmission Redundancy version: this notifies of a duplicate version of HARQ.

Transmit power control (TPC) command for physical uplink control channel (PUCCH): this notifies of a transmit power control command for a PUCCH, which is an uplink control channel.

The DCI goes through a channel coding and modulation process, and is then transmitted through a physical downlink control channel (PDCCH) or an enhanced PDCCH (EPDCCH), which is a downlink physical control channel.

In general, the DCI is channel-coded independently for each terminal, and is then configured as an independent PDCCH and transmitted. In the time domain, the PDCCH is mapped and transmitted during the control channel transmission interval. The frequency domain mapping position of the PDCCH is determined by the identifier (ID) of each terminal and is spread over all system transmission bands.

The downlink data is transmitted through a physical downlink shared channel (PDSCH), which is a physical channel for downlink data transmission. The PDSCH is transmitted after the control channel transmission interval, and scheduling information, such as a specific mapping position in the frequency domain, the modulation scheme, and the like, is notified of by the DCI transmitted through the PDCCH. Hereinafter, the PDCCH transmission/reception may be understood as the DCI transmission/reception on the PDCCH.

The base station notifies the terminal of the modulation scheme applied to the PDSCH to be transmitted to the terminal and the size of data {transport block size (TBS)} to be transmitted through the MCS of 5 bits, among the control information constituting the DCI. The TBS corresponds to a size before channel coding for error correction is applied to the data (i.e., transport block) to be transmitted by the base station.

The modulation schemes supported by the LTE system are quadrature phase shift keying (QPSK), 16-quadrature amplitude modulation (QAM), and 64QAM, and their modulation orders ($Q_m$) correspond to 2, 4, and 6, respectively. That is, 2 bits per symbol can be transmitted in the QPSK modulation; 4 bits per symbol can be transmitted in the 16QAM; and 6 bits per symbol can be transmitted in the 64QAM.

3GPP LTE Release 10 adopts bandwidth extension technology in order to support a higher data rate than LTE Release 8. The above technique, called bandwidth extension or carrier aggregation (CA), may extend a band so as to increase the amount of data transmission to the extent of the extended band, compared to an LTE Release 8 terminal, which transmits data in a single band. Each of the above bands is referred to as a component carrier (CC), and the LTE Release 8 terminal is defined to have one component carrier for each of the downlink and the uplink. In addition, the downlink component carrier and the uplink component carrier, which is connected thereto through a system information block (SIB)-2, are bundled and referred to as a cell. The SIB-2 connection relationship between the downlink component carrier and the uplink component carrier is transmitted through a system signal or a higher layer signaling. The terminal supporting the CA may receive downlink data through a plurality of serving cells, and may transmit uplink data.

If it is difficult for the base station to transmit a PDCCH to a specific terminal in a specific serving cell in Release 10, another serving cell may transmit the PDCCH, and may configure a carrier indicator field (CIF) informing that the corresponding PDCCH indicates a physical downlink shared channel (PDSCH) or a physical uplink shared channel (PUSCH) of another serving cell. The CIF may be configured to a terminal supporting the CA. The CIF is determined by adding 3 bits to the PDCCH information in a specific serving cell so as to indicate another serving cell. The CIF is included only when performing cross carrier scheduling, and if the CIF is not included, the cross carrier scheduling is not performed. If the CIF is included in the downlink (DL) assignment, the CIF indicates a serving cell for transmitting a PDSCH scheduled by the DL assignment, and if the CIF is included in the uplink (UL) grant, the CIF is defined to indicate a serving cell in which a PUSCH scheduled by the UL grant is transmitted.

As described above, carrier aggregation, which is a bandwidth extension technique, may be defined so that a plurality of serving cells may be configured to the terminal in Release 10. In addition, the terminal periodically or aperiodically transmits channel information on the plurality of serving cells to the base station for data scheduling of the base station.

The base station schedules data for each carrier and transmits the data, and the terminal transmits A/N feedback on data transmitted for each carrier. LTE Release 10 was designed such that A/N feedback of up to 21 bits is transmitted and such that if the transmission of the A/N feedback and the transmission of the channel information are simultaneously performed in one subframe, the A/N feedback is transmitted while discarding the channel information. LTE Release 11 was designed such that channel information of one cell is multiplexed with the A/N feedback so that A/N feedback of up to 22 bits and channel information of one cell are transmitted using PUCCH format 3 in a transmission resource of PUCCH format 3.

LTE Release 13 assumes a maximum of 32 serving cell configuration scenarios, and thus a technique for extending the number of serving cells up to 32 using unlicensed bands, as well as licensed bands, has been introduced. In addition, considering that the number of licensed bands, such as LTE frequencies, is limited, a technique called a licensed assisted access (LAA) to provide LTE services in unlicensed bands, such as a band of 5 GHz, was introduced. The LAA provides support such that an LTE cell, which is a licensed cell, is operated as a P cell and an LAA cell, which is an unlicensed cell, is operated as an S cell by applying the carrier aggregation in the LTE system. Therefore, the feedback produced in the LAA cell as an S cell must be transmitted only in the P cell as in the LTE system, and a downlink subframe and an uplink subframe may be freely applied to the LAA cell. The LTE is understood to encompass all the technologies evolved from LTE, such as LTE-A and LAA, unless otherwise stated herein.

Meanwhile, since a new radio access technology (NR) (i.e., a $5^{th}$ generation wireless cellular communication system), which is a communication system subsequent to LTE (hereinafter, referred to as a 5G system in the specification), must freely reflect various requirements of users, service providers, and the like, services satisfying various requirements may be supported.

Therefore, the 5G system may be defined as technology for satisfying requirements selected for respective 5G services, such as enhanced mobile broadband (eMBB), massive machine type communication (mMTC), ultra-reliable and low-latency communication (URLLC), and the like, from among requirements such as a maximum terminal transmission rate of 20 Gbps, a maximum terminal velocity of 500 km/h, a maximum latency time of 0.5 ms, a terminal connection density of 1,000,000 terminals/km², and the like.

For example, in order to provide eMBB services in the 5G system, it is required to provide a maximum terminal transmission rate of 20 Gbps in the downlink and a maximum terminal transmission rate of 10 Gbps in the uplink with respect to one base station. In addition, the average transmission speed of the terminal that can be actually experienced must be increased. In order to meet the requirements described above, there is a need for improved transmission and reception techniques including a more improved multiple-input multiple-output (MIMO) transmission technique.

In addition, mMTC services are being considered to support application services, such as the Internet of Things (IoT), in the 5G system. The mMTC has requirements, such as support of connection of large numbers of terminals in the cell, enhancement of the terminal coverage, improved battery time, and a reduction in the cost of a terminal, in order to effectively provide the Internet of Things. Since the Internet of Things is provided to various sensors and various devices to thus provide a communication function, it must support a large number of terminals (e.g., 1,000,000 terminals/km²) in the cell. In addition, the mMTC requires a wider coverage than the eMBB because the terminals are likely to be located in shadow areas, such as a basement of a building, an area that is not covered by a cell, or the like, due to the nature of the service. The mMTC requires a very long battery life time because it is likely to be configured as a low-cost terminal and it is difficult to frequently replace the battery of the terminal.

Finally, the URLLC services, which are used for remote control for robots or machines, industrial automation, unmanned aerial vehicles, remote health control, emergency notifications, or the like, must provide cellular-based wireless communication having ultra-low latency and ultra-reliability for specific purposes. For example, the URLLC must satisfy a maximum latency time of less than 0.5 ms, and also has a requirement of providing a packet error rate of 10-5 or less. Therefore, a transmission time interval (TTI) smaller than that of 5G service, such as the eMBB, must be provided for the URLLC, and a design for allocating large amount of resources in the frequency band is also required.

The services considered in the $5^{th}$ generation wireless cellular communication system described above must be provided as a single framework. That is, for efficient resource management and control, it is preferable to integrate the respective services into a single system to thus be controlled and transmitted, instead of operating the respective services independently.

Figure 2:
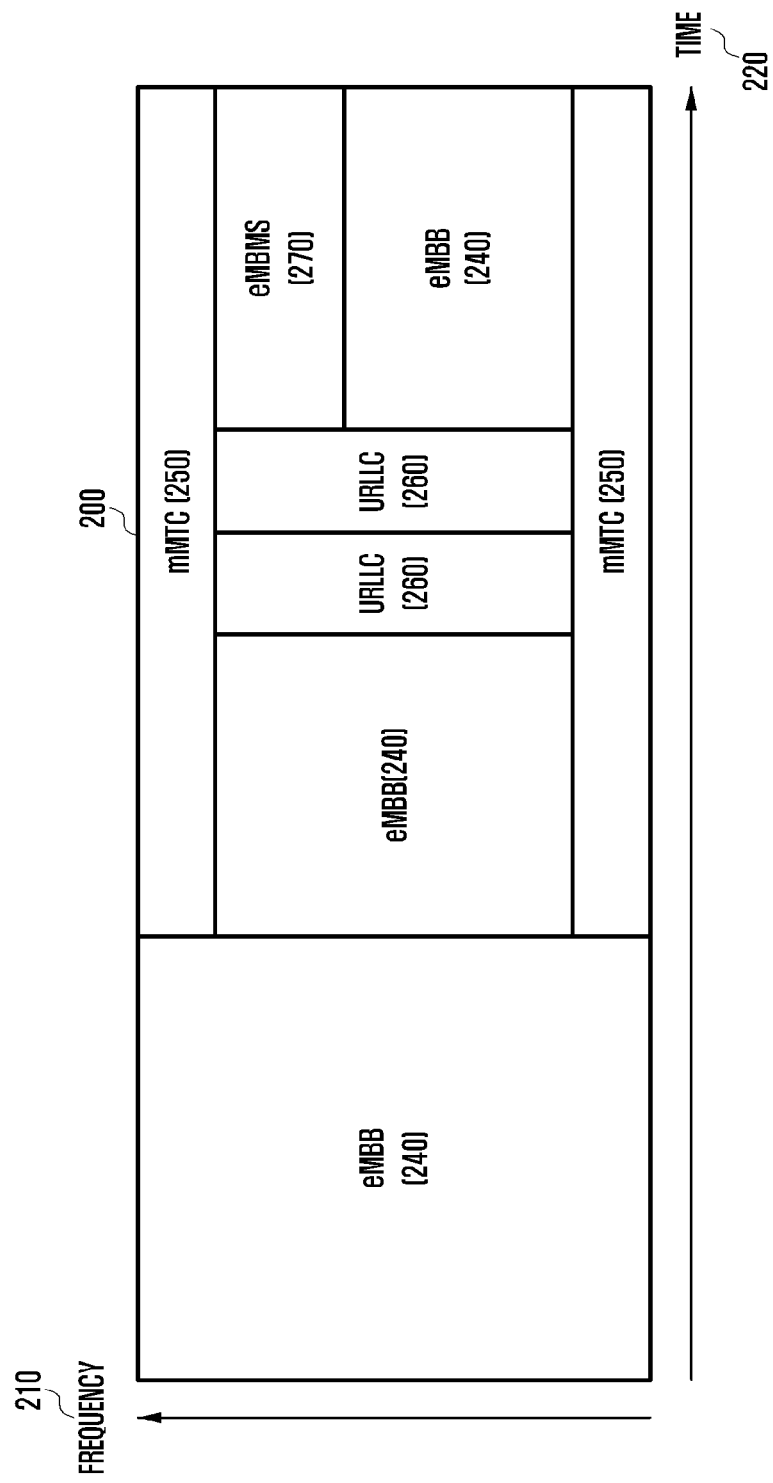
FIG. 2 is a diagram illustrating an example in which 5G services are multiplexed and transmitted in one system.

FIG. 2 is a diagram illustrating an example in which services considered in the 5G system are multiplexed as a single system to then be transmitted.

In FIG. 2, a frequency-time resource 200 used in the 5G system may be configured as a frequency axis 210 and a time axis 220. FIG. 2 shows an example in which the eMBB 240, the mMTC 250, and the URLLC 260 are operated by a 5G base station in one framework in the 5G system. In addition, an enhanced mobile broadcast/multicast service (eMBMS) 270 for providing a broadcast service on a cellular basis may be further considered in the 5G system. The services considered in the 5G system, such as the eMBB 240, the mMTC 250, the URLLC 260, and the eMBMS 270, may be multiplexed through time-division multiplexing (TDM) or frequency division multiplexing (FDM) within a single system frequency bandwidth operated in the 5G system, and may then be transmitted. In addition, spatial division multiplexing may be considered.

In the case of the eMBB 240, it is preferable to occupy a maximum frequency bandwidth for transmission at a specific time in order to provide the increased data rate described above. Therefore, it is preferable that the eMBB 240 service be multiplexed by the TDM along with other services within a system transmission bandwidth 200 and then be transmitted, or it is also preferable that the eMBB 240 service be multiplexed by the FDM along with other services within a system transmission bandwidth and then be transmitted according to the needs of other services.

Unlike other services, the mMTC 250 requires an increased transmission interval in order to secure wide coverage, and may ensure coverage by repeatedly transmitting the same packet within the transmission interval. In addition, in order to reduce the complexity and the terminal price, the transmission bandwidth that the terminal can receive is limited. In consideration of the requirements described above, the mMTC 250 is preferably multiplexed by the FDM along with other services within the transmission system bandwidth 200 of the 5G system and is then transmitted.

The URLLC 260 preferably has a shorter transmission time interval (TTI) than other services in order to meet the ultra-low latency requirement desired by the service. In addition, since the URLLC must have a low coding rate in order to satisfy the ultra-reliable requirement, it is desirable to have a wide bandwidth on the frequency side. In consideration of the above requirements of the URLLC 260, the URLLC 260 is preferably multiplexed by the TDM with other services within the transmission system bandwidth 200 of the 5G system.

The respective services described above may have different transmission/reception schemes and transmission/reception parameters to satisfy the requirements desired by the services. For example, the respective services may have different numerologies depending on service requirements. In this case, the numerology includes the length of a cyclic prefix (CP), a subcarrier spacing (SCS), the length of an OFDM symbol, a transmission interval length (TTI), and the like in a communication system based on orthogonal frequency division multiplexing (OFDM) or orthogonal frequency division multiple access (OFDMA).

As an example of the services having different numerologies, the eMBMS 270 may have a CP length longer than other services. The eMBMS may transmit broadcast-based higher layer traffic, thereby transmitting the same data in all cells. In this case, if signals received in a plurality of cells reach the terminal so as to be delayed within a CP length, the terminal may receive and decode all of the signals, thereby obtaining a single frequency network (SFN) gain. Therefore, a terminal located at a cell boundary may also receive broadcast information without restriction of coverage. However, if the CP length is relatively longer than other services in supporting the eMBMS in the 5G system, waste due to the CP overhead is incurred. Therefore, an OFDM symbol length longer than that of other services is required, and a subcarrier interval narrower than that of other services is also applied.

In addition, as an example of services having different numerologies in the 5G system, since the URLLC requires a TTI less than other services, a shorter OFDM symbol length may be required, and a wider subcarrier interval may also be applied.

The necessity for various services to satisfy various requirements in the 5G system and the requirements for primarily considered services have been described above.

The operation frequencies considered in the 5G system range from several GHz to tens of GHz. The FDD is preferred over the TDD in a low frequency band of several GHz, and the TDD is considered to be suitable over the FDD in a high frequency band of tens of GHz. However, unlike the FDD that has separate frequencies for uplink/downlink transmission and continuously provides uplink/downlink transmission resources, the TDD must support both uplink and downlink transmission in one frequency and provides only an uplink resource or a downlink resource over time.

Assuming that the URLLC uplink transmission or downlink transmission is required in the TDD, it is difficult to satisfy the ultra-low latency requirement desired by the URLLC due to the latency until an uplink or downlink resource appears. Therefore, in order to satisfy the ultra-low latency requirement of the URLLC in the case of the TDD, there is a need for a method of dynamically switching the subframe into an uplink subframe or a downlink subframe depending on whether the data of the URLLC is for the uplink or downlink.

Meanwhile, in the case of multiplexing services and techniques for 5G phase 2 or beyond-5G to the 5G operation frequency in the future in the 5G system, there is a requirement of providing the 5G phase 2 or beyond-5G techniques and services to avoid incurring a backward compatibility problem in the operation of the 5G system. This requirement is referred to as forward compatibility, and technologies for satisfying the forward compatibility must be considered when designing a 5G system.

In the early stage of LTE standardization, there was a lack of consideration of the forward compatibility, which may cause restrictions in providing new services within the LTE framework. For example, the enhanced machine type communication (eMTC) applied to LTE Release 13 can be performed only at a frequency corresponding to 1.4 MHz, regardless of the system transmission bandwidth provided by a serving cell, in order to cut down the terminal price by reducing the complexity thereof. Therefore, the terminal supporting the eMTC cannot receive signals in the time interval during which the PDCCH is transmitted because the terminal cannot receive the PDCCH transmitted in the entire band of the existing system transmission bandwidth.

Accordingly, the 5G system must be designed such that the services considered subsequent to the 5G system coexist and operate efficiently with the 5G system. For forward compatibility in 5G systems, the resources must be freely allocated and transmitted such that the services considered in the future can be freely transmitted in the time-frequency resource domain supported by the 5G system. Therefore, a method for freely allocating the time-frequency resources to support forward compatibility in the 5G system is required.

Hereinafter, preferred embodiments of the disclosure will be described in detail with reference to the accompanying drawings. It should be noted that the same elements are denoted by the same reference numerals in the accompanying drawings. In addition, a detailed description of well-known functions and configurations, which may obscure the subject matter of the disclosure, will be omitted.

Further, the embodiments of the disclosure will be described in detail with reference to LTE and 5G systems. However, it will be understood by those skilled in the art that the primary subject matter of the disclosure can be applied to other communication systems having similar technical backgrounds and channel forms by slightly modifying the disclosure without departing from the scope of the disclosure.

Hereinafter, a 5G system in which standalone 5G cells are operated or a 5G system in which standalone 5G cells are connected through dual connectivity or carrier aggregation to thus operate as non-standalone cells will be described.

Figure 3:
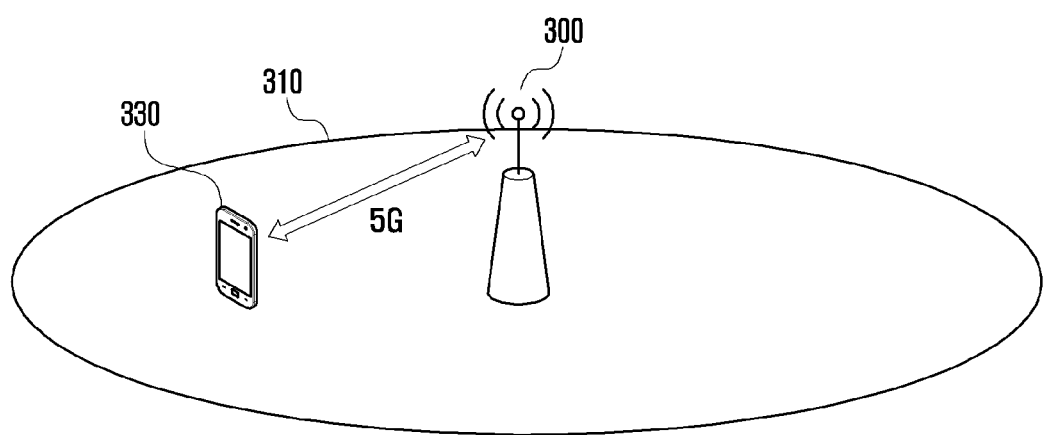
FIG. 3 is a diagram illustrating a first embodiment of a communication system to which the disclosure is applied.
Figure 4:
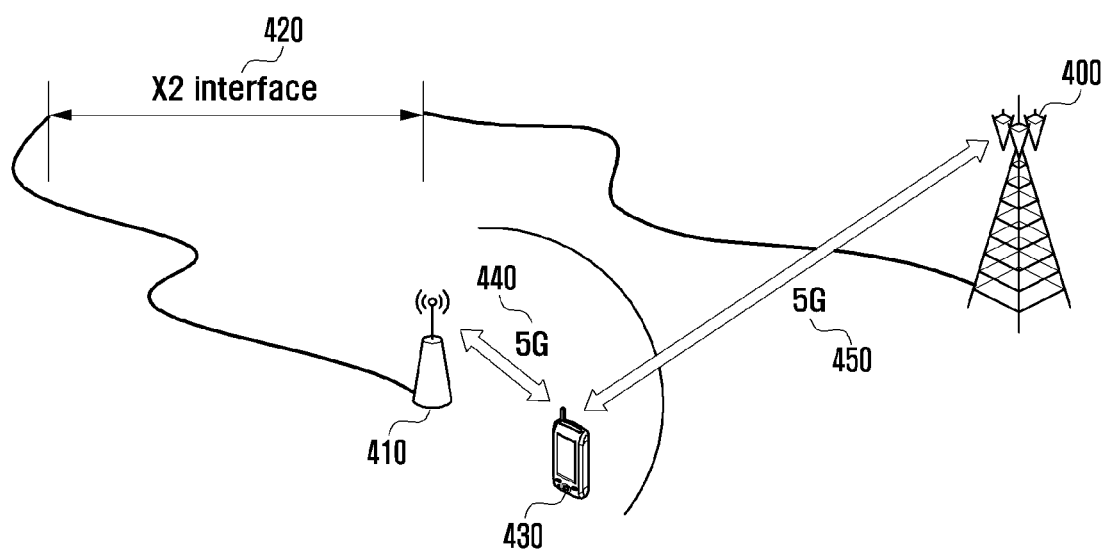
FIG. 4 is a diagram illustrating a second embodiment of a communication system to which the disclosure is applied.

FIGS. 3 and 4 are diagrams illustrating first and second embodiments of a communication system to which the disclosure is applied. The techniques suggested by the disclosure are applicable both to the system in FIG. 3 and to the system in FIG. 4.

Referring to FIG. 3, FIG. 3 illustrates the case where a standalone 5G cell 310 operates in a single base station 300 in a network. The terminal 330 is a 5G-capable terminal having a 5G transmission/reception module. The terminal 330 obtains synchronization from a synchronization signal transmitted from the standalone 5G cell 300 and attempts random access to the 5G base station 300 after receiving system information. The terminal 330 transmits/receives data through the 5G cell 310 after a radio resource control (RRC) connection with the 5G base station 300 is established. In this case, there is no limitation on the duplexing method of the 5G cell 310. In the system of FIG. 3, the 5G cell may include a plurality of serving cells.

Referring to FIG. 4, FIG. 4 shows that a standalone 5G base station 400 and a non-standalone 5G base station 410 for increasing the data transmission amount are provided. The terminal 400 is a 5G-capable terminal having a 5G transmission/reception module to perform 5G communications in a plurality of base stations. The terminal 430 acquires synchronization from a synchronization signal transmitted from the standalone 5G base station 400 and attempts random access to the standalone 5G base station 400 after receiving system information. The terminal 430 further configures a non-standalone 5G cell 440 after an RRC connection with the standalone base station 400 is established and transmits/receives data through the standalone 5G base station 400 or the non-standalone 5G base station 410. In this case, it is assumed that there is no limitation on the duplexing method of the standalone 5G base station 400 or the non-standalone base station 410, and the standalone 5G base station 400 and the non-standalone 5G base station 410 are connected to each other through an ideal backhaul network or a non-ideal backhaul network. Thus, the ideal backhaul network 420 enables fast X2 communication between the base stations. In the system of FIG. 4, the 5G cell may include a plurality of serving cells.

Next, a method of classifying subframes into a plurality of types of subframes in the case where the TDD is operated in the 5G system in FIGS. 3 and 4 and of considering a specific type of subframe, among the plurality of types of subframes, as a subframe that can dynamically switch to an uplink/downlink subframe so as not to exceed a maximum latency time will be described.

Figure 5:
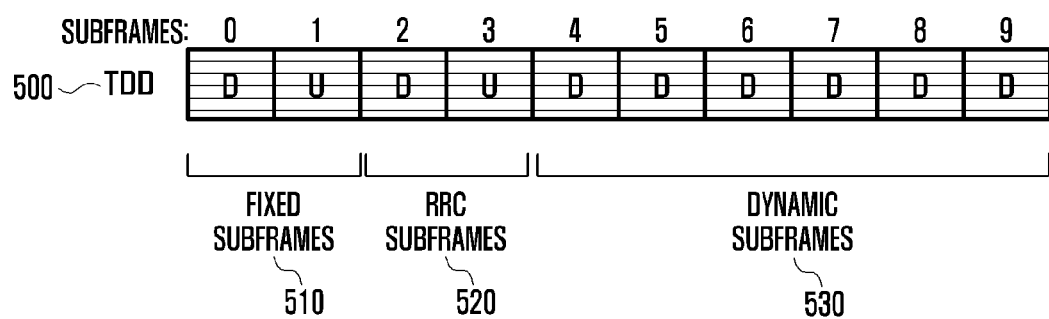
FIG. 5 is a diagram illustrating a first embodiment of operating a 5G system for each type of subframe in a TDD.

First, FIG. 5 is a diagram illustrating a first embodiment of operating a 5G system for each type of subframe in the TDD. Referring to FIG. 5, in the case where the 5G system is operated in a single TDD carrier, the subframes may be divided into fixed subframes, RRC subframes, and dynamic subframes. Transmission of a synchronization signal and system information and random access may be performed in the fixed subframes; transmission of additional system information and additional random access may be performed in the RRC subframes; and an operation of dynamically changing the subframe to conform to uplink and downlink data and transmitting/receiving data may be performed in the dynamic subframes.

The base station divides the subframes into fixed subframes, RRC subframes, and dynamic subframes in operating the TDD. First, the fixed subframes will be described.

In FIG. 5, TDD 500 information (such as carrier frequency bandwidth (BW) and location information or the like) may be transmitted from the 5G base station to the 5G-capable terminal, and the 5G-capable terminal may obtain the above information through synchronization acquisition and reception of essential system information in the fixed subframes 510. The positions and the number of fixed subframes 510 in FIG. 5 are only examples, and other positions of the fixed subframes, other numbers of fixed subframes, downlink fixed subframes, and uplink fixed subframes may be predetermined through the standard. The 5G-capable terminal attempts to obtain synchronization and essential system information in the downlink fixed subframes, obtains random access-related information through the received essential system information, and attempts random access in the uplink fixed subframes.

Next, the RRC subframes 520 will be described. The number of fixed subframes 510 is preferably configured to a minimum in the standard. This is due to the fact that the latency time due to the fixed subframes must be considered if the number of fixed subframes 510 increases. If uplink data transmission for the URLLC occurs in the downlink fixed subframe, the URLLC uplink data transmission must be delayed until the uplink subframe appears. In this case, it is difficult to satisfy the ultra-low latency time requirement for the URLLC. Therefore, in order to support transmission of service-specific system information and random access commands by the base station according to the number of terminals in the cell, the base station is allowed to configure the RRC subframes 520 by transmitting a higher layer signaling while minimizing the number and positions of fixed subframes 510, and the terminal obtains the uplink/downlink positions and the number of RRC subframes 520 from the reception of the higher layer signaling and performs only decoding of control information in a configured direction in the RRC subframes 520, thereby reducing the decoding complexity.

Therefore, if no information on the RRC subframe 520 is received from the base station, the terminal attempts to decode the downlink control information with respect only to the downlink fixed subframes 510, instead of decoding the downlink control information with respect to the uplink fixed subframes 510. The terminal determines all the remaining subframes, except for the fixed subframes 510, to be dynamic subframes 530 and attempts to decode all the downlink control information for both the uplink subframe and the downlink subframe for each subframe.

If the terminal receives information on the RRC subframes 520 transmitted from the base station, the terminal attempts to decode the downlink control information with respect only to the downlink fixed subframe 510, instead of decoding the downlink control information with respect to the uplink fixed subframe 510. Next, the terminal attempts to decode the downlink control information with respect only to the downlink RRC subframes 520, instead of decoding the downlink control information with respect to the uplink RRC subframes 520. The terminal determines all the remaining subframes, except for the fixed subframes 510 and the RRC subframes 520, to be dynamic subframes 530 and attempts to decode all of the downlink control information with respect both to the uplink subframes and to the downlink subframes for each subframe.

Next, the dynamic subframes 530 will be described. The dynamic subframes 530 may be downlink subframes or uplink subframes depending on the base station scheduling. The terminal determines whether the dynamic subframe 530 is for an uplink or a downlink by receiving downlink control information transmitted from the base station and performs downlink data reception and uplink data transmission according to the determined subframe and the scheduling by the decoded downlink control information.

Next, a method of classifying subframes into a plurality of types of subframes in the case where the TDD is operated in the 5G system in FIGS. 3 and 4 and of considering a specific type of subframe, among the plurality of types of subframes, as a subframe that can dynamically switch to an uplink/downlink subframe so as not to exceed a maximum latency time will be described.

Figure 6:
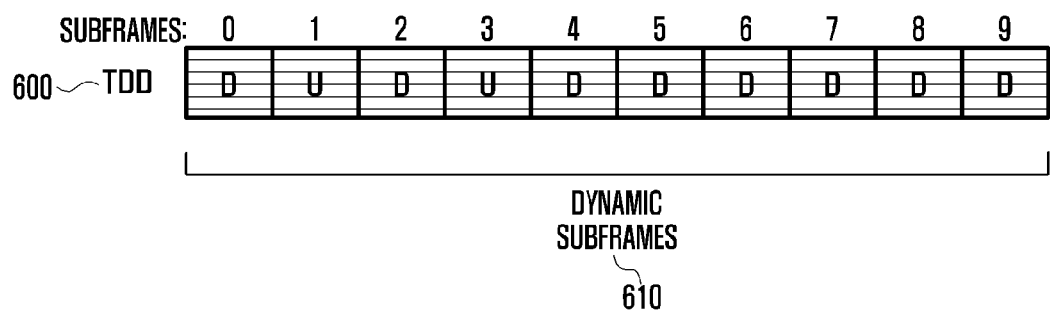
FIG. 6 is a diagram illustrating a second embodiment of operating a 5G system for each type of subframe in a TDD.

FIG. 6 is a diagram illustrating a second embodiment of operating a 5G system for each type of subframe in the TDD. According to FIG. 6, in the case where the 5G system is operated in a single TDD carrier, all subframes may be operated as dynamic subframes; transmission of a synchronization signal and system information and random access may be performed through another standalone 5G cell; and the dynamic subframes may dynamically switch to conform to uplink/downlink data to thus transmit/receive data.

The base station operates all the subframes as dynamic subframes in operating the TDD. First, a method in which a terminal performs transmission of a synchronization signal and system information and random access will be described.

In FIG. 6, TDD 600 information (such as carrier frequency bandwidth and location information or the like) may be transmitted, to the 5G-capable terminal, from another standalone 5G base station connected through carrier aggregation or dual connectivity, and the 5G-capable terminal may obtain the above information through synchronization acquisition and reception of essential system information from the standalone 5G base station.

Since all subframes are operated as dynamic subframes 610, the dynamic subframes 610 may be downlink subframes or uplink subframes depending on the base station scheduling. The terminal determines whether the corresponding dynamic subframe 610 is for an uplink or a downlink by receiving downlink control information transmitted by the base station and performs downlink data reception and uplink data transmission according to the determined subframe and the scheduling by the decoded downlink control information.

Figure 7A:
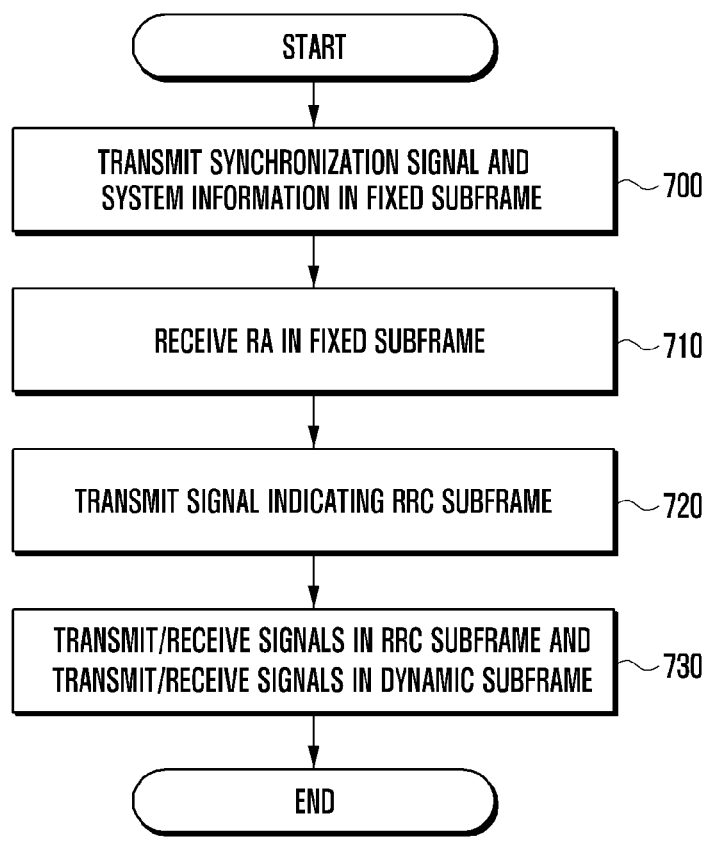
FIGS. 7A & B is a diagram illustrating procedures of a base station and a terminal for operating a 5G system for each type of subframe in a TDD according to an embodiment of the disclosure.
Figure 7B:
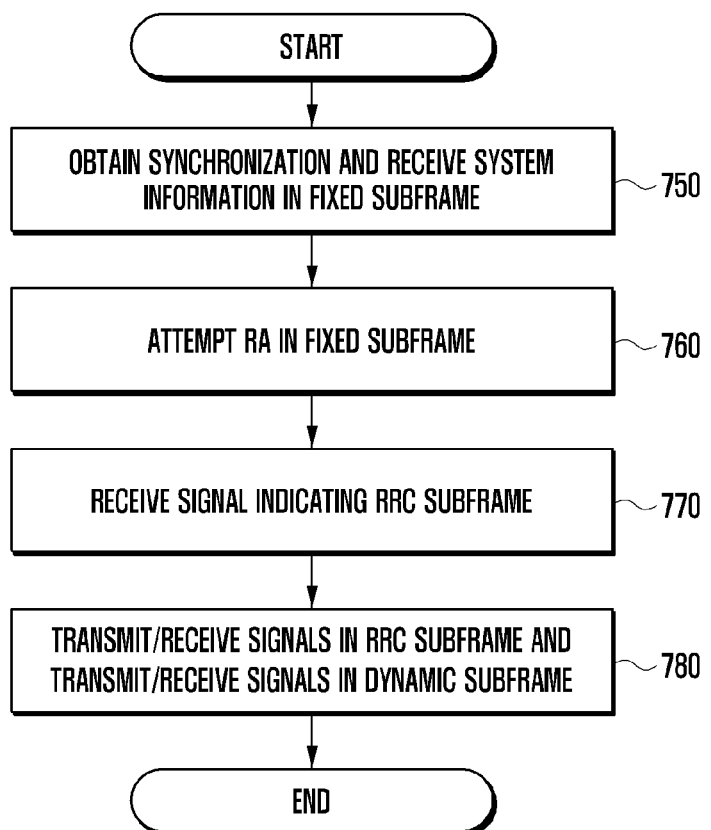

Next, FIGS. 7A and 7B are diagrams illustrating procedures of a base station and a terminal for operating a 5G system for each type of subframe in a TDD according to an embodiment of the disclosure. A procedure in which a 5G base station divides subframes into the respective types of subframes to thus configure 5G resources in a TDD and transmits/receives data to/from the 5G terminal in the resources for 5G will be described with reference to FIGS. 7A and 7B.

According to FIG. 7A, the 5G base station transmits, to the 5G terminal, a synchronization signal and system information in a fixed subframe in step 700. The synchronization signal for the 5G system may be transmitted as a separate synchronization signal for the eMBB, the mMTC, and the URLLC using different numerologies, or may be transmitted as a common synchronization signal in a specific 5G resource using one numerology. The system information may include 5G frequency information (carrier frequency, physical resource block, or the like), time information (radio frame index, subframe index, MB SFN subframe information for 5G transmission, and information on random access), antenna information, spatial information, duplex information (FDD DL, UL carrier information, TDD uplink (UL)/downlink (DL) configuration information, and LAA operation-related information), a reference signal or a synchronization signal, and the like. The above system information may be transmitted by means of a common system signal in a specific 5G resource using one numerology, or may be transmitted as separate system information for the eMBB, the mMTC, and the URLLC using different numerologies.

In step 710, the 5G base station detects a random access signal from the 5G terminal in a fixed subframe and performs a random access procedure with the 5G terminal.

In step 720, the 5G base station transmits a signal indicating an RRC subframe to the 5G terminal. Step 720 may be performed when it is determined to be necessary by the 5G base station. If the signal is not transmitted, the subframes are operated only as fixed subframes and dynamic subframes.

In step 730, the 5G base station transmits/receives signals to/from the 5G terminal in the RRC subframes and the dynamic subframes. The information to be transmitted/received and the procedure of the base station follow the description for FIGS. 5 and 6.

Next, a procedure in which a 5G terminal is allocated with 5G resources for each set type of subframe by the 5G base station in a TDD and transmits/receives data to/from the 5G base station in the resources for 5G will be described.

According to FIG. 7B, the 5G terminal receives, from the 5G base station, a synchronization signal and system information in a fixed subframe in step 750. The synchronization signal for the 5G system may be transmitted as a separate synchronization signal for the eMBB, the mMTC, and the URLLC using different numerologies, or may be transmitted as a common synchronization signal in a specific 5G resource using one numerology. The system information may include 5G frequency information (carrier frequency, physical resource block, or the like), time information (radio frame index, subframe index, MB SFN subframe information for 5G transmission, and information on random access), antenna information, spatial information, duplex information (FDD DL, UL carrier information, TDD uplink/downlink configuration information, and LAA operation-related information), a reference signal or a synchronization signal, and the like. The above system information may be received by means of a common system signal in a specific 5G resource using one numerology, or may be received as separate system information for the eMBB, the mMTC, and the URLLC using different numerologies.

In step 760, the 5G terminal attempts random access in the fixed subframe and performs a random access procedure with the 5G base station.

In step 770, the 5G terminal receives a signal indicating an RRC subframe from the 5G base station. If the 5G terminal fails to receive the signal in step 770, the 5G terminal determines that the subframes include only fixed subframes and dynamic subframes.

In step 780, the 5G terminal transmits/receives signals to/from the 5G base station in the RRC subframes and the dynamic subframes. The information to be transmitted/received and the procedure of the terminal follow the description for FIGS. 5 and 6.

Figure 8:
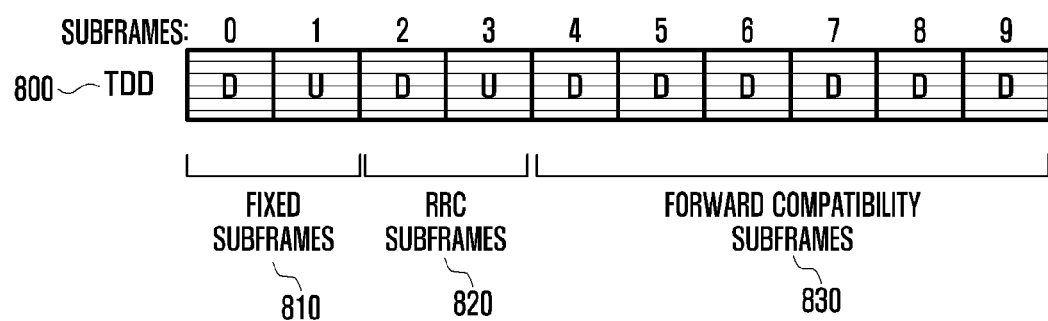
FIG. 8 is a diagram illustrating a first embodiment for providing forward compatibility for each type of subframe in a TDD.

FIG. 8 is a diagram illustrating a first embodiment for providing forward compatibility for each type of subframe in a TDD. A method of preventing a backward compatibility problem from occurring in supporting 5G services and techniques in the case of providing the 5G phase 2 or beyond-5G techniques and services in the future will be described with reference to FIG. 8.

In FIG. 8, in the case where the 5G system is operated in a single TDD carrier, the subframes may be divided into fixed subframes, RRC subframes, and forward compatibility subframes. Transmission of a synchronization signal and system information and random access may be performed in the fixed subframes; transmission of additional system information and additional random access may be performed in the RRC subframes; and transmission/reception of 5G data or transmission/reception of data for 5G phase 2 and beyond-5G techniques and services may be performed in the forward compatibility subframes. Therefore, no matter what the forward compatibility subframes are used for, there is no backward compatibility problem in supporting 5G services and techniques because essential and additional system operations are performed through the fixed subframes or the RRC subframes.

More specifically, the base station divides subframes into fixed subframes, RRC subframes, and forward compatibility subframes in operating the TDD. First, fixed subframes will be described.

In FIG. 8, TDD 800 information (such as carrier frequency bandwidth and location information or the like) may be transmitted from the 5G base station to the 5G-capable terminal, and the 5G-capable terminal may obtain the above information through synchronization acquisition and reception of essential system information in the fixed subframes 810. The positions and the number of fixed subframes 810 in FIG. 8 are only examples, and other positions of the fixed subframes, other numbers of fixed subframes, downlink fixed subframes, and uplink fixed subframes may be predetermined according to the standard. The 5G-capable terminal attempts to obtain synchronization and essential system information in the downlink fixed subframes, obtains random access-related information from the received essential system information, and attempts random access in the uplink fixed subframes.

Next, the RRC subframes 820 will be described. The number of fixed subframes 810 is preferably configured as a minimum in the standard. This is due to the fact that if the number of fixed subframes 810 increases, the latency time due to the fixed subframes must be considered, and the number of subframes available for the forward compatibility is reduced. If uplink data transmission for the URLLC occurs in the downlink fixed subframe, the URLLC uplink data transmission must be delayed until an uplink subframe appears. In this case, it is difficult to satisfy the ultra-low latency time requirement for the URLLC. Therefore, in order to support the transmission of service-specific system information and random access commands by the base station according to the number of terminals in the cell, the base station is allowed to configure the RRC subframes 820 by transmitting a higher layer signaling while minimizing the number and positions of fixed subframes 810, and the terminal obtains the uplink/downlink positions and the number of RRC subframes 820 through the reception of the higher layer signaling and performs only decoding of downlink control information in a configured direction in the RRC subframes 820, thereby reducing decoding complexity.

Therefore, if no information on the RRC subframe 820 is received from the base station, the terminal attempts to decode the downlink control information with respect to the downlink fixed subframes 810, instead of decoding the downlink control information with respect to the uplink fixed subframes 810. The terminal determines all the remaining subframes, except for the fixed subframes 810, to be forward compatibility subframes 830 and attempts to decode all the downlink control information for both the uplink subframe and the downlink subframe for each subframe. If the terminal fails to receive any downlink control information, the terminal does not perform any operation in the forward compatibility subframes and enters an idle state, thereby reducing power consumption.

If the terminal receives information on the RRC subframes 820 transmitted from the base station, the terminal attempts to decode the downlink control information with respect to the downlink fixed subframes 810, instead of decoding the downlink control information with respect to the uplink fixed subframes 810. Next, the terminal attempts to decode the downlink control information with respect to the downlink RRC subframes 820, instead of decoding the downlink control information with respect to the uplink RRC subframes 820. The terminal determines all the remaining subframes, except for the fixed subframes 810 and the RRC subframes 820, to be forward compatibility subframes 830 and attempts to decode all the downlink control information with respect both to the uplink subframe and to the downlink subframe for each subframe. If the terminal fails to receive any downlink control information, the terminal does not perform any operation in the forward compatibility subframes and enters an idle state, thereby reducing power consumption. In fact, the terminal may not be aware of the existence of the forward compatibility subframes, and may also determine that no downlink control information has been received in the forward compatibility subframes.

Next, the forward compatibility subframes 830 will be described. The forward compatibility subframe 830 may be a downlink subframe or an uplink subframe depending on the base station scheduling. The terminal determines whether the corresponding subframe 830 is for an uplink or a downlink by receiving downlink control information transmitted from the base station and performs downlink data reception and uplink data transmission according to the determined subframe and the scheduling by the decoded downlink control information. If the terminal fails to receive any downlink control information, the terminal does not perform any operation in the forward compatibility subframes and enters an idle state, thereby reducing power consumption. In fact, the terminal may not be aware of the existence of the forward compatibility subframes, and may also determine that no downlink control information has been received in the forward compatibility subframes.

Figure 9:
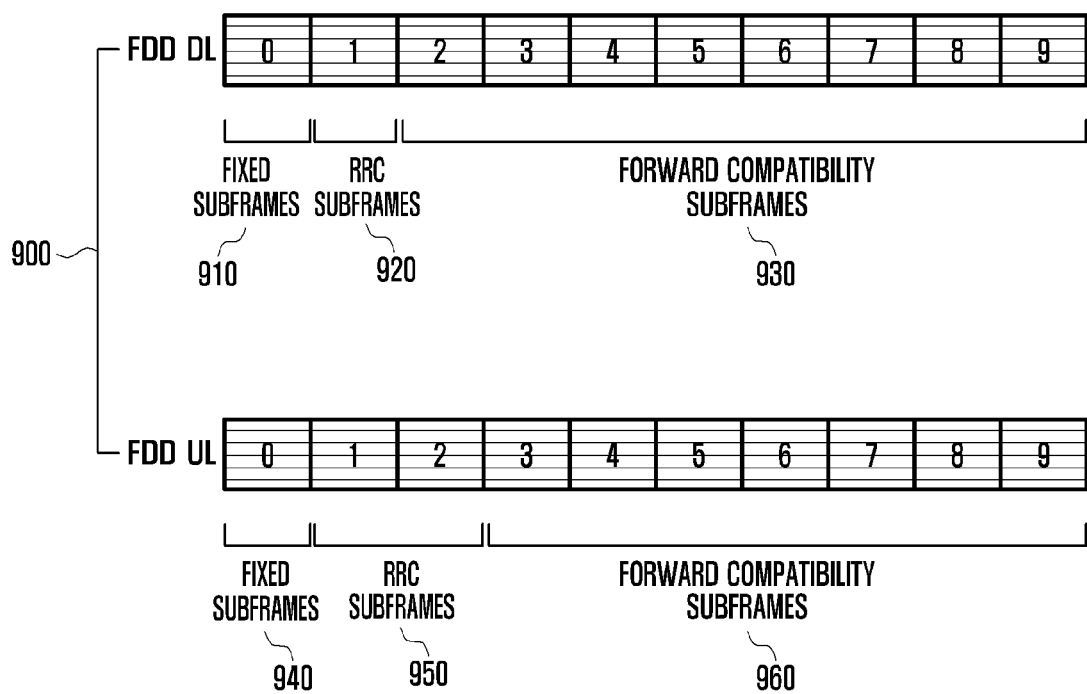
FIG. 9 is a diagram illustrating a second embodiment for providing forward compatibility for each type of subframe in an FDD.

FIG. 9 is a diagram illustrating a second embodiment for providing forward compatibility for each type of subframe in an FDD.

A method of preventing a backward compatibility problem from occurring in supporting 5G services and techniques in the case of providing the 5G phase 2 or beyond-5G techniques and services in the future will be described with reference to FIG. 9.

In FIG. 9, in the case of operating a 5G system in an FDD, the subframes may be divided into fixed subframes, RRC subframes, and forward compatibility subframes for each downlink carrier and uplink carrier; transmission of a synchronization signal and system information and random access may be performed in the fixed subframes of the downlink carrier; transmission of additional system information and additional random access may be performed in the RRC subframes; and transmission/reception of 5G data or transmission/reception of data for 5G phase 2 and beyond-5G techniques and services may be performed in the forward compatibility subframes. In addition, competition-based random access may be performed in the fixed subframes of the uplink carrier; additional random access triggered by the base station may be performed in the RRC subframes; and transmission/reception of 5G data or transmission/reception of data for 5G phase 2 and beyond-5G techniques and services may be performed in the forward compatibility subframes. Therefore, no matter what the forward compatibility subframes are used for, there is no backward compatibility problem in supporting 5G services and techniques because essential and additional system operations are performed through the fixed subframes or the RRC subframes.

More specifically, the base station divides subframes of a downlink carrier and an uplink carrier into fixed subframes, RRC subframes, and forward compatibility subframes, respectively, in operating the FDD.

First, a fixed subframe 910 of a downlink carrier and a fixed subframe 940 of an uplink carrier will be described.

In FIG. 9, FDD 900 information (such as downlink and uplink carrier frequency bandwidths and location information or the like) may be transmitted from the 5G base station to the 5G-capable terminal, and the 5G-capable terminal may obtain the above information through synchronization acquisition and reception of essential system information in the fixed subframe 910 of the downlink carrier. The positions and the number of fixed subframes 910 in FIG. 9 are only examples, and other positions of the fixed subframes and other numbers of fixed subframes may be predetermined according to the standard. The 5G-capable terminal attempts to obtain synchronization and essential system information in the fixed subframes and obtains random access-related information from the received essential system information. The 5G-capable terminal attempts random access in the fixed subframes 940 of the uplink carrier through the obtained random access-related information. The positions and the number of fixed subframes 910 of the uplink carrier in FIG. 9 are only examples, and other positions of the fixed subframes and other numbers of fixed subframes may be predetermined according to the standard.

Next, the RRC subframes 920 of the downlink carrier and the RRC subframes 950 of the uplink carrier will be described. The number of fixed subframes 910 and 940 is preferably set to a minimum in the standard. This is due to the fact that if the number of fixed subframes 910 and 940 increases, the latency time due to the fixed subframes must be considered, and the number of subframes available for forward compatibility is reduced. Therefore, in order to support the transmission of service-specific system information and random access commands by the base station according to the number of terminals in the cell, the base station is allowed to configure the RRC subframes 920 and 950 by transmitting a higher layer signaling while minimizing the number and positions of fixed subframes 910 and 940, and the terminal obtains the positions and the number of RRC subframes 920 and 950 of the downlink carrier and the uplink carrier from the reception of the higher layer signaling.

Therefore, if no information on the RRC subframes 920 and 950 is received from the base station, the terminal determines all the remaining subframes, except for the fixed subframes 910 and 940, to be forward compatibility subframes 930 and 960 and attempts to decode all of the downlink control information for each subframe 930. If the terminal fails to receive any downlink control information, the terminal does not perform any operation in the forward compatibility subframes and enters an idle state, thereby reducing power consumption.

If the terminal receives information on the RRC subframes 920 and 950 transmitted from the base station, the terminal determines all the remaining subframes, except for the fixed subframes 910 and 940 and the RRC subframes 920 and 950, to be forward compatibility subframes 930 and 960 and attempts to decode all the downlink control information with respect both to the uplink subframe and to the downlink subframe for each subframe 930. If the terminal fails to receive any downlink control information, the terminal does not perform any operation in the forward compatibility subframes and enters an idle state, thereby reducing power consumption. In fact, the terminal may not be aware of the existence of the forward compatibility subframes, and may also determine that no downlink control information has been received in the forward compatibility subframes.

Next, the forward compatibility subframe 930 and 960 will be described. If the terminal fails to receive any downlink control information in the forward compatibility subframe 930 according to the base station scheduling, the terminal does not perform any operation in the forward compatibility subframes 930 and 960 and enters an idle state, thereby reducing power consumption. In fact, the terminal may not be aware of the existence of the forward compatibility subframes, and may also determine that no downlink control information has been received in the forward compatibility subframes.

Figure 10A:
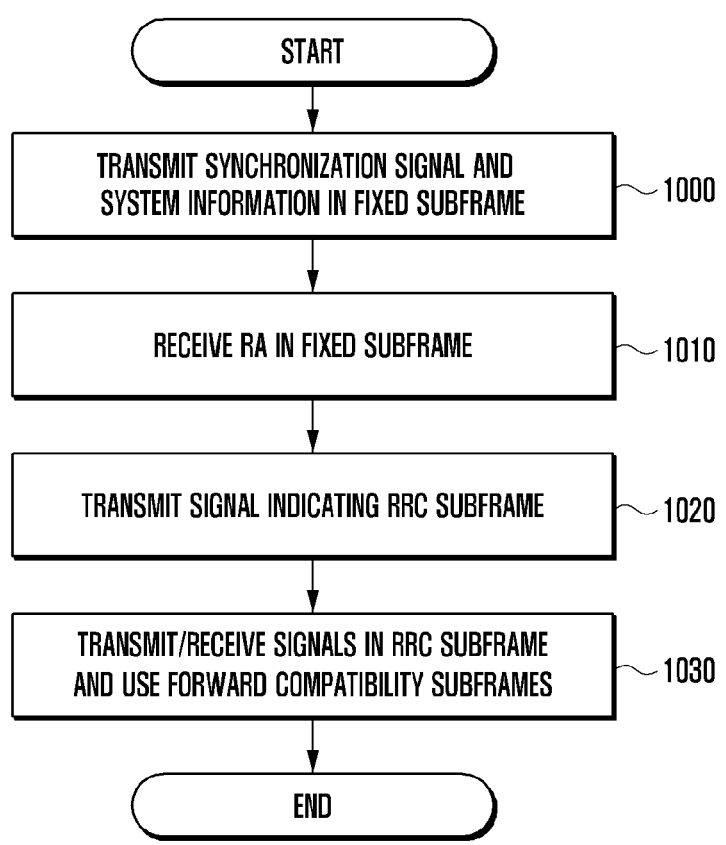
FIGS. 10A & B is a diagram illustrating procedures of a base station and a terminal for providing forward compatibility for each type of subframe according to an embodiment of the disclosure.
Figure 10B:
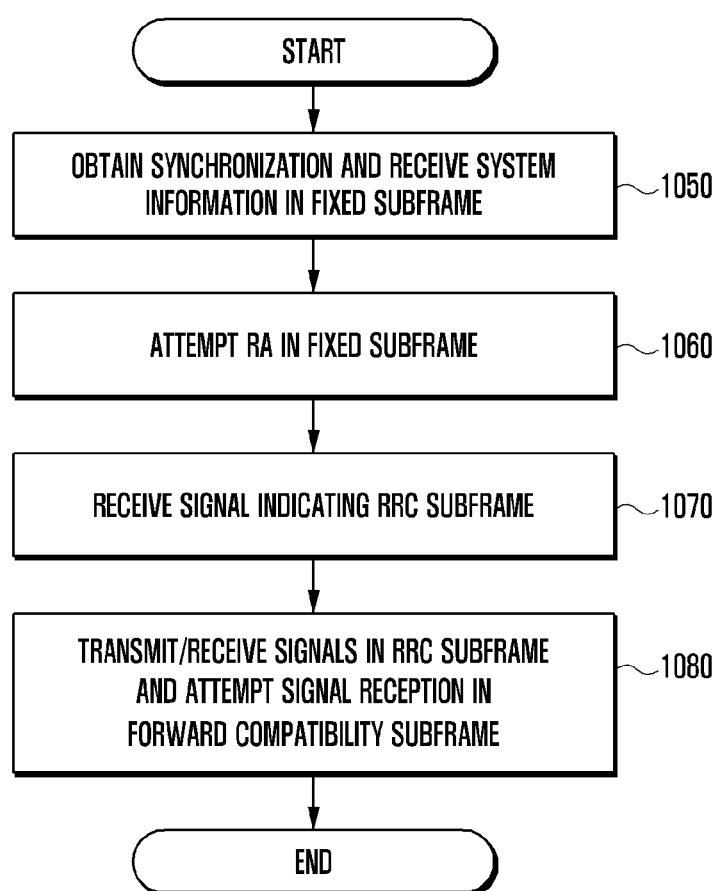

Next, FIGS. 10A and 10B are diagrams illustrating procedures of a base station and a terminal for realizing forward compatibility for each type of subframe according to an embodiment of the disclosure. The method in which a 5G base station configures resources for the forward compatibility by setting 5G resources for each type of subframe and the procedure in which the base station transmits/receives data to/from the 5G terminal in the resources for 5G system will be described with reference to FIGS. 10A and 10B.

According to FIG. 10A, the 5G base station transmits, to the 5G terminal, a synchronization signal and system information in the fixed subframes in step 1000. The synchronization signal for the 5G system may be transmitted as a separate synchronization signal for the eMBB, the mMTC, and the URLLC using different numerologies, or may be transmitted as a common synchronization signal in a specific 5G resource using one numerology. The system information may include 5G frequency information (carrier frequency, physical resource block, or the like), time information (radio frame index, subframe index, MBSFN subframe information for transmission, and information on random access), antenna information, spatial information, duplex information (FDD DL, UL carrier information, TDD uplink/downlink configuration information, and LAA operation-related information), a reference signal or a synchronization signal, and the like. The above system information may be transmitted by means of a common system signal in a specific 5G resource using one numerology, or may be transmitted as separate system information for the eMBB, the mMTC, and the URLLC using different numerologies.

In step 1010, the 5G base station detects a random access signal from the 5G terminal in the fixed subframe and performs a random access process with the 5G terminal.

In step 1020, the 5G base station transmits a signal indicating an RRC subframe to the 5G terminal. Step 1020 may be performed when it is determined to be necessary by the 5G base station. If the signal is not transmitted, the subframes are operated only as fixed subframes and forward compatibility subframes.

In step 1030, the 5G base station transmits/receives signals to/from the 5G terminal in the RRC subframes and the forward compatibility subframes. The information to be transmitted/received and the procedure of the base station follow the description of FIGS. 8 and 9.

Next, a procedure in which the 5G terminal is allocated with 5G resources for each type of subframe by the 5G base station and transmits/receives data to/from the 5G base station in the resources for the 5G system will be described.

According to FIG. 10B, the 5G terminal receives, from the 5G base station, a synchronization signal and system information in the fixed subframes in step 1050. The synchronization signal for the 5G system may be transmitted as a separate synchronization signal for the eMBB, the mMTC, and the URLLC using different numerologies, or may be transmitted as a common synchronization signal in a specific 5G resource using one numerology. The system information may include 5G frequency information (carrier frequency, physical resource block, or the like), time information (radio frame index, subframe index, MB SFN subframe information for 5G transmission, and information on random access), antenna information, spatial information, duplex information (FDD DL, UL carrier information, TDD uplink/downlink configuration information, and LAA operation-related information), a reference signal or a synchronization signal, and the like. The above system information may be received by means of a common system signal in a specific 5G resource using one numerology, or may be received as separate system information for the eMBB, the mMTC, and the URLLC using different numerologies.

In step 1060, the 5G terminal attempts random access in the fixed subframe and performs a random access process with the 5G base station.

In step 1070, the 5G terminal receives a signal indicating an RRC subframe from the 5G base station. If the 5G terminal fails to receive the signal in step 1070, the 5G terminal determines that the subframes include only fixed subframes and forward compatibility subframes.

In step 1080, the 5G terminal transmits/receives signals to/from the 5G base station in the RRC subframes and the forward compatibility subframes. The information to be transmitted/received and the procedure of the terminal follow the description of FIGS. 8 and 9.

Next, a method of supporting the operation of another service in the situation in which an emergency URLLC service is supported in a dynamic TDD will be described with reference to FIG. 11.

Figure 11:
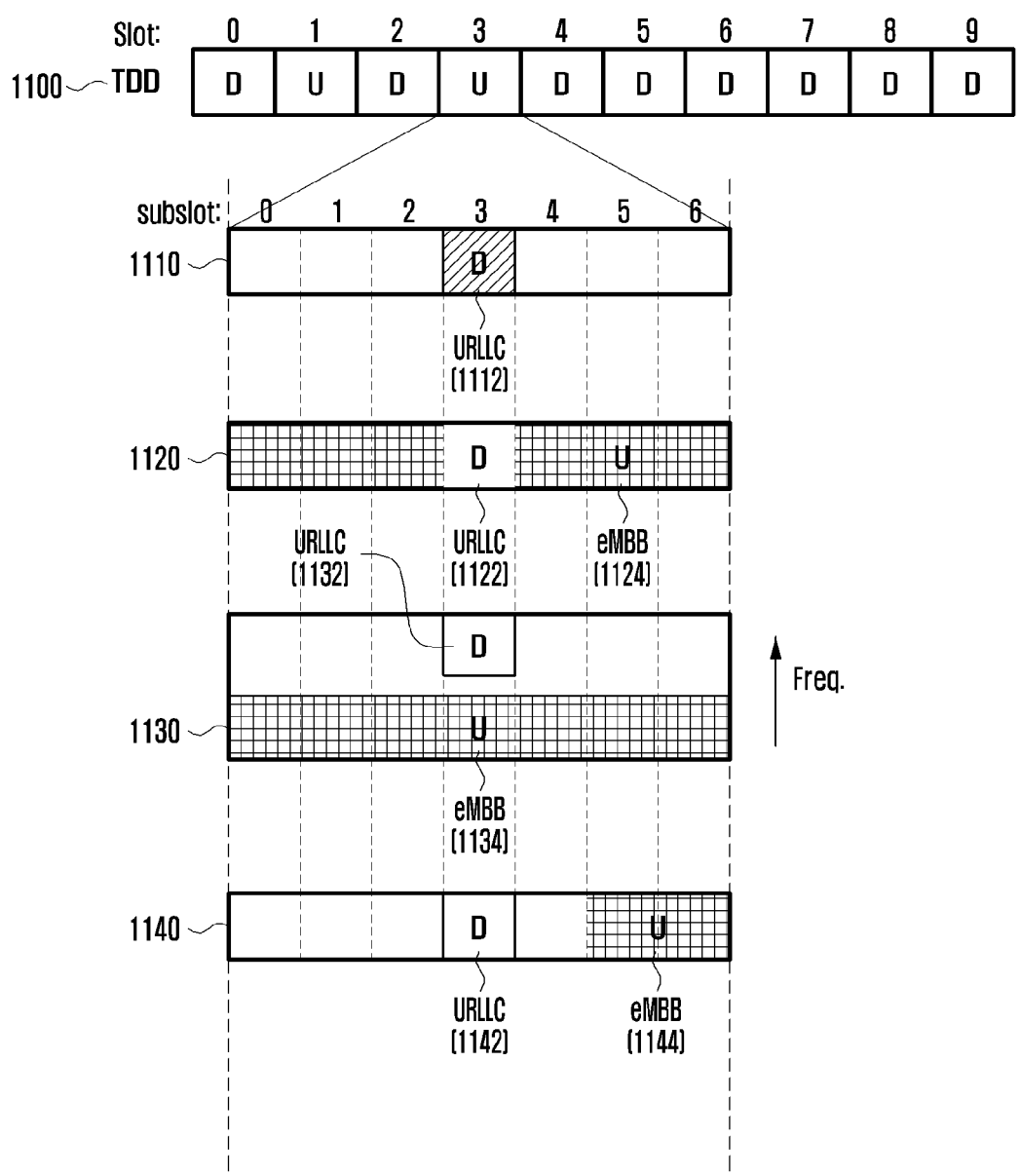
FIG. 11 is a diagram illustrating a first embodiment of operating another service in the situation in which an emergency URLLC service is supported in a TDD.

FIG. 11 is a diagram illustrating a first embodiment of operating another service in the situation in which an emergency URLLC service is supported in a TDD.

The dynamic TDD transmission in FIG. 11 means operating subframes that can dynamically switch to uplink/downlink subframes, and follows the method described in FIGS. 5 and 6. The base station may transmit a dynamic TDD transmission configuration to the terminal using a higher layer signaling, and the terminal, upon receiving the higher layer signaling, recognizes that the subframes can dynamically switch to uplink/downlink subframes according to the dynamic TDD transmission and performs decoding for common and dedicated downlink control channels according thereto. If the higher layer signaling is not configured, the terminal determines positions of the uplink/downlink subframes according to the uplink/downlink configuration configured by the system information blocks (SIBs) and performs decoding for common and downlink control channels in the downlink subframes.

The emergency URLLC transmission is a service that requires an ultra-low latency requirement. The base station may transmit, to the URLLC terminal, an emergency URLLC transmission configuration according to the ultra-low latency requirement using a higher layer signaling, and the URLLC terminal, upon receiving the higher layer signaling, may perform operations according to the emergency URLLC transmission/reception. If the higher layer signaling is not configured, the URLLC terminal may perform normal data transmission/reception with respect to the base station.

In FIG. 11, TDD 1100 information (such as carrier frequency bandwidth and location information or the like) may be transmitted from the 5G base station to the 5G-capable terminal. The 5G-capable terminal may obtain the above information through synchronization acquisition and reception of essential system information from the TDD cell in the case where the TDD cell is a standalone cell or from another cell in the case where the TDD cell is not a standalone cell. The 5G-capable terminal attempts to obtain synchronization and essential system information, obtains random access-related information from the received essential system information, and attempts random access to the TDD cell or another cell.

If the TDD cell 1100 supports both the eMBB service and the URLLC service, data transmission/reception for the eMBB service is conducted on the basis of slots, and data transmission/reception for the URLLC service is conducted on the basis of slots or subslots (or mini-slots). The slot may include 7 or 14 OFDM symbols, and the subslot (or mini-slot) may include fewer OFDM symbols than the slot. Since the subslot includes fewer OFDM symbols than the slot, it is suitable to satisfy the ultra-low latency requirement. The number of OFDM symbols in the slot or the subslot may be defined as the standard for each subcarrier interval, or various numbers may be defined to then be transmitted to the terminal from the base station using a higher layer signaling or system information. The terminal may receive the higher layer signaling or the system information, thereby obtaining the number and length of OFDM symbols of the slot or subslot.

Reference numerals 1110 to 1140 illustrate an example in which emergency URLLC downlink transmission is performed from the base station to the URLLC terminal in slot 3. Slot 3 may be determined as an uplink slot before the emergency URLLC downlink transmission occurs. In this case, the uplink transmission of the eMBB terminal may be scheduled or the aperiodic channel transmission may be triggered in a previous downlink slot. Alternatively, the uplink A/N feedback transmission in response to the downlink data transmission of the eMBB terminal in the previous downlink slot may be configured to be performed in slot 3 (uplink A/N feedback transmission timing may be configured through information of the downlink control channel scheduling the downlink data). Alternatively, periodic channel transmission of the eMBB terminal may be configured in slot 3.

However, in the case where an emergency downlink URLLC transmission occurs in the base station and is to be performed in slot 3, the base station must switch slot 3 from the uplink slot to a downlink slot, thereby performing the emergency downlink URLLC transmission. Thus, the above-described eMBB uplink transmissions cannot be performed as scheduled or configured in the previous slot. Therefore, the disclosure proposes a solution to the problem in which the eMBB uplink transmission cannot be performed due to the emergency downlink URLLC transmission.

In the case where slot 3 must switch from the uplink to the downlink due to the emergency URLLC downlink transmission, the base station may transmit a slot switch signal to all terminals in the cell through a common downlink control channel. Alternatively, the base station may transmit a slot switch signal to specific terminals, which must perform the eMBB uplink transmission in slot 3, through dedicated downlink control channels. Alternatively, the base station may transmit uplink transmission indication information indicating whether or not the eMBB uplink transmission can still be performed to the terminals, which must perform the eMBB uplink transmission in slot 3, through a common or dedicated downlink control channel.

The slot switch signal includes information indicating that the slot has switched to the uplink or the downlink. The eMBB terminal, upon receiving the uplink transmission indication information or the slot switch signal, operates according to the method proposed in the disclosure. The operation of the terminal will be described with reference to reference numerals 1120 to 1140 in FIG. 11.

Reference numeral 1120 shows a diagram describing the uplink transmission operation of the eMBB terminal in the case in which the uplink transmission of the eMBB terminal in the previous downlink slot is scheduled in slot 3 or in which the aperiodic channel transmission is triggered. In 1120, the eMBB terminal receives a slot switch signal from the base station and determines that the uplink slot has switched to a downlink slot. Then, the first proposal for the eMBB terminal operation is that the eMBB terminal waits for new uplink data scheduling or aperiodic channel transmission triggering by ignoring the uplink transmission scheduled or triggered in the previous downlink slot. The new uplink data scheduling or the aperiodic channel transmission triggering may be received in slot 3. The eMBB terminal performs uplink transmission in another slot according to the scheduling and triggering received in slot 3. The base station performs emergency URLLC downlink transmission 1122 in subslot 3. The second proposal for the eMBB terminal operation is that the eMBB terminal ignores the uplink transmission scheduled or triggered in the previous downlink slot and performs the uplink data or aperiodic channel transmission in the nearest uplink slot that follows the same.

Reference numeral 1130 shows a diagram describing the uplink transmission operation of the eMBB terminal in the case in which the uplink transmission of the eMBB terminal in the previous downlink slot is scheduled in slot 3 or in which the aperiodic channel transmission is triggered. In addition, reference numeral 1130 illustrates an example in which the eMBB terminal supports a URLLC function or an example in which the eMBB terminal receives an indication for the URLLC transmission resource or uplink transmission indication information. The indication for the URLLC transmission resource includes information on emergency URLLC transmission resources for transmitting data within the maximum latency time that the URLLC must satisfy, such as URLLC transmission frequency resources, time resources, a resource configuration period, or the like. The uplink transmission indication information instructs the eMBB terminal as to whether or not to perform the uplink transmission scheduled or configured in the previous slot in the case where a plurality of URLLC transmissions are performed. For example, uplink transmission indication information of 1 bit may be configured such that 0 indicates that the uplink transmission must not be performed and 1 indicates that the uplink transmission can be performed.

Therefore, the operation described in the embodiment may be applied to the case where the terminal supporting the eMBB and the URLLC receives a higher layer signaling for setting the emergency URLLC as described above, the case where the eMBB terminal receives an indication for the URLLC transmission resource, or the case where the eMBB terminal receives uplink transmission indication information. The indication for the URLLC transmission resource or the uplink transmission indication information may be transmitted from the base station through a higher layer signaling or common and/or dedicated downlink control channels at the time of the emergency URLLC transmission or after the emergency URLLC transmission, and the eMBB terminal may receive the indication or the uplink transmission indication information.

In 1130, the eMBB terminal receives a slot switch signal from the base station to thus determine that the uplink slot has switched to a downlink slot. The operation of the eMBB terminal when the base station performs emergency URLLC downlink transmission 1132 in subslot 3 is as follows. The eMBB terminal receives the emergency URLLC downlink control channel 1132 or an indication for the emergency URLLC downlink transmission resource, and if the transmission resource of the received URLLC data 1132 is different from the transmission resource for the eMBB uplink transmission 1134 (it is assumed that different frequency resources are used in the embodiment), or if the uplink transmission indication information instructs the eMBB terminal to perform the eMBB uplink transmission, the eMBB terminal continues to perform the eMBB uplink transmission 1134. The eMBB terminal receives an emergency URLLC downlink control channel 1132 or an indication for the emergency URLLC downlink transmission resource, and if the transmission resource of the received URLLC data 1132 overlaps the transmission resource for the eMBB uplink transmission 1134, or if the uplink transmission indication information instructs the eMBB terminal not to perform the eMBB uplink transmission, the eMBB terminal no longer performs the eMBB uplink transmission 1134.

Reference numeral 1140 shows a diagram describing the uplink transmission operation of the eMBB terminal in the case where the uplink A/N feedback transmission of the eMBB terminal in response to the downlink data transmission in the previous downlink slot is configured to be performed in slot 3 or in the case where the periodic channel transmission of the eMBB terminal is configured in slot 3. The embodiment can be applied to the case where the A/N feedback transmission or the periodic channel transmission is performed through several OFDM symbols in the rear part of the slot. In addition, reference numeral 1140 shows an example in which the eMBB terminal supports a URLLC function or an example in which the eMBB terminal receives an indication for the transmission resource of the URLLC or uplink transmission indication information.

The indication for the URLLC transmission resource includes information on emergency URLLC transmission resources for transmitting data within the maximum latency time that the URLLC must satisfy, such as URLLC transmission frequency resources, time resources, a resource configuration period, or the like. The uplink transmission indication information instructs the eMBB terminal as to whether or not to perform the uplink transmission scheduled or configured in the previous slot in the case where a plurality of URLLC transmissions are performed. For example, uplink transmission indication information of 1 bit may be configured such that 0 indicates that the uplink transmission must not be performed and 1 indicates that the uplink transmission can be performed.

Therefore, the operation described in the embodiment may be applied to the case where the terminal supporting the eMBB and the URLLC receives a higher layer signaling for setting an emergency URLLC as described above, the case where the eMBB terminal receives an indication for the URLLC transmission resource, or the case where the eMBB terminal receives uplink transmission indication information. The indication for the URLLC transmission resource or the uplink transmission indication information may be transmitted from the base station through a higher layer signaling or common and/or dedicated downlink control channels at the time of the emergency URLLC transmission or after the emergency URLLC transmission, and the eMBB terminal may receive the indication or the uplink transmission indication information.

In 1140, the eMBB terminal receives a slot switch signal from the base station and determines that the uplink slot has switched to a downlink slot. The base station performs an emergency URLLC downlink transmission 1142 in sub slot 3, and subsequent operation of the eMBB terminal is as follows. The eMBB terminal receives an emergency URLLC downlink control channel 1142 or an indication for the emergency URLLC downlink transmission resource, and if the transmission resource of the received URLLC data 1142 is different from the transmission resource for the eMBB uplink transmission 1144 (it is assumed that different frequency resources are used in the embodiment), or if the uplink transmission indication information instructs the eMBB terminal to perform the eMBB uplink transmission, the eMBB terminal continues to perform the eMBB uplink transmission 1144. The eMBB terminal receives an emergency URLLC downlink control channel 1142 or an indication for the emergency URLLC downlink transmission resource, and if the transmission resource of the received URLLC data 1142 overlaps the transmission resource for the eMBB uplink transmission 1144, or if the uplink transmission indication information instructs the eMBB terminal not to perform the eMBB uplink transmission, the eMBB terminal no longer performs the eMBB uplink transmission 1144.

Although FIG. 11 has described the embodiment of the uplink transmission indication information instructing the eMBB terminal to perform or not to perform the uplink transmission previously configured or scheduled by means of a higher layer signaling or physical signal in the case of the eMBB transmission and the URLLC transmission in the TDD cell 1100, the embodiment can be applied to the FDD cell. That is, uplink transmission indication information instructing the eMBB terminal to perform or not to perform the uplink transmission in the uplink carrier of the FDD cell, which is configured or scheduled to the eMBB terminal by the transmission of a higher layer signaling or a physical signal in the downlink carrier of the FDD cell, may be transmitted to the eMBB terminal through a physical signal in the downlink carrier of the FDD cell. If the eMBB terminal receives the uplink transmission indication information in the downlink carrier of the FDD cell, the eMBB terminal may, or may not, perform the uplink transmission in the uplink carrier of the FDD cell, which is previously configured or scheduled to the eMBB terminal by the transmission of a higher layer signaling or a physical signal, according to the indication of the received uplink transmission indication information.

Next, an example in which emergency URLLC uplink transmission from a URLLC terminal to a base station is performed will be described with reference to FIGS. 12 and 13.

Figure 12:
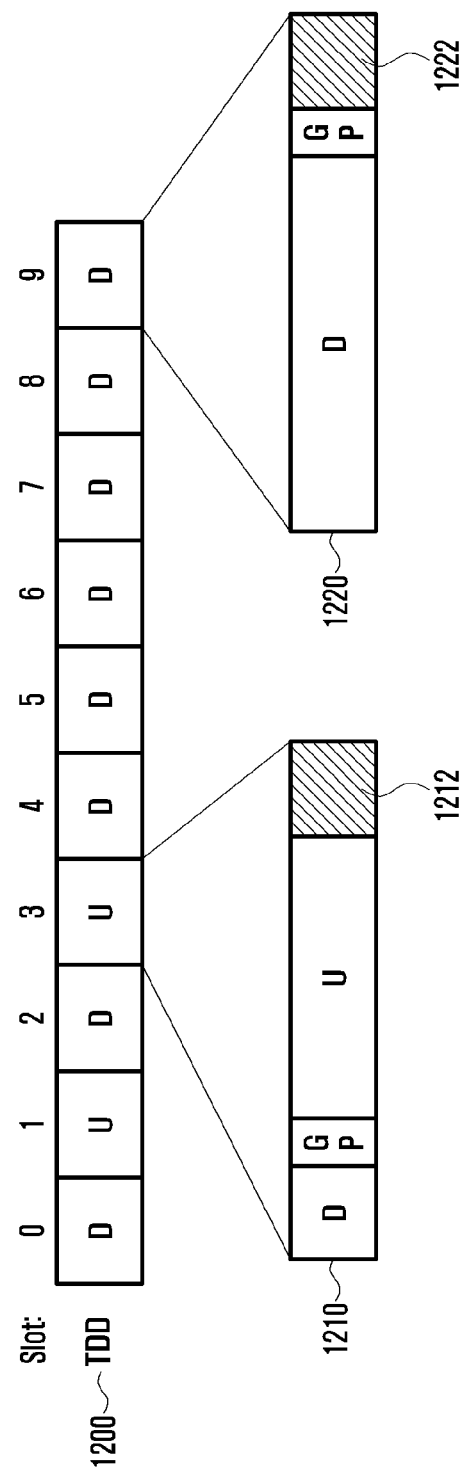
FIG. 12 is a diagram illustrating a method for supporting an emergency URLLC service in a TDD.

FIG. 12 is a diagram illustrating a method for supporting an emergency URLLC service in a TDD.

In contrast to FIG. 11, if emergency URLLC uplink transmission occurs and is to be transmitted from the URLLC terminal to the base station, the URLLC terminal must notify the base station that the emergency URLLC uplink transmission is to be performed in the next slot. If the base station recognizes that the emergency URLLC uplink transmission is occurring in the next slot, and if the next slot is a downlink slot, the base station must switch the downlink slot to an uplink slot, and must transmit a slot switch signal. In this case, a method by which the URLLC terminal notifies the base station that the emergency URLLC uplink transmission is to be performed is required. The terminal may determine the occurrence of the emergency URLLC uplink transmission on the basis of the following conditions or combinations thereof.

First, a packet IP or a port number may be separately mapped with the emergency URLLC uplink data in the higher layer. Accordingly, if the data mapped with the packet IP or the port number is received in a buffer, the terminal may determine that the emergency URLLC uplink data has occurred.

Second, a specific logical channel ID may be mapped with the emergency URLLC uplink data in the higher layer. Thus, if the data having the logical channel ID is received in a buffer, the terminal may determine that emergency URLLC uplink data has been produced.

If the emergency URLLC uplink data having the logical channel ID or general uplink data is received in a buffer, the terminal may transmit, to the base station, a buffer status report (BSR) indicating the status of the buffer or a scheduling request (SR), may receive the uplink data scheduling according thereto from the base station, and may transmit emergency URLLC uplink data or general uplink data as scheduled according to the uplink data scheduling. Alternatively, the terminal may transmit, to the base station, the emergency URLLC uplink signal described in the disclosure, and may transmit the emergency URLLC uplink data on the uplink resource pre-configured by means of a higher layer signaling.

In FIG. 12, TDD 1200 information (such as carrier frequency bandwidth and location information or the like) may be transmitted from the 5G base station to the 5G-capable terminal, and the 5G-capable terminal may obtain the above information through synchronization acquisition and reception of essential system information from the TDD cell in the case where the TDD cell is a standalone cell or from another cell in the case where the TDD cell is not a standalone cell. The 5G-capable terminal attempts to obtain synchronization and essential system information, obtains random access-related information through the received essential system information, and attempts random access to the TDD cell or another cell.

Reference numerals 1210 and 1222 in FIG. 12 show self-contained slot structures. The slot 1210 includes a downlink part, a guard period (GP), and an uplink part. The downlink part may transmit a reference signal, a downlink control channel, and the like; the guard period is intended to ensure a propagation delay and an RF switching time of a terminal and a base station; and the uplink part may transmit a reference signal, an uplink data channel, an uplink control channel, and the like. The slot 1220 includes a downlink part, a guard period (GP), and an uplink part. The downlink part may transmit a reference signal, a downlink control channel, a downlink data channel, and the like; the guard period is intended to ensure a propagation delay and an RF switching time of a terminal and a base station; and the uplink part may transmit a reference signal, an uplink control channel, and the like. An important difference between the slots 1210 and 1220 is that an uplink data channel can be transmitted in the slot 1210, whereas a downlink data channel can be transmitted in the slot 1220. Both the slot 1210 and the slot 1220 have the uplink parts 1212 and 1222 at the ends thereof in common. In the case of FIGS. 5 and 6 in which the slot of the TDD 1200 may dynamically switch to the uplink/downlink slot, the slot 1210 may be operated as an uplink slot, and the slot 1220 may be operated as a downlink slot. The terminal may receive information on the uplink slot 1210 and the downlink slot 1220 through a common downlink control channel or a dedicated downlink control channel.

The terminal may transmit a signal notifying that emergency URLLC uplink transmission is to be performed (referred to as an emergency URLLC uplink transmission signal in the disclosure) in the uplink parts 1212 and 1222 of the uplink slot 1210 and the downlink slot 1220. In the first transmission method, a scheduling request and an emergency URLLC uplink transmission signal are included in a single uplink control channel to thus be transmitted in the uplink part 1212 or 1222. Therefore, the scheduling request and the emergency URLLC uplink transmission signal, which are information of 1 bit or 2 bits, may be distinguished between each other to then be transmitted in the uplink control channel. Alternatively, the scheduling request and the emergency URLLC uplink transmission signal may be configured so as to use different transmission resources with respect to the uplink control channel, and thus it is possible to transmit the scheduling request and the emergency URLLC uplink transmission signal through different transmission resources from each other according to whether the terminal wishes to transmit the scheduling request or the emergency URLLC uplink signal. Alternatively, the terminal is able to transmit the scheduling request and the emergency URLLC uplink transmission signal, respectively, by means of separate uplink control channels.

The reason for designing the scheduling request and the emergency URLLC uplink transmission signal separately is that the URLLC terminal does not always transmit the uplink signal that must satisfy the ultra-low latency requirement. For example, in the case where the terminal transmits RRC configuration information or capability information of the terminal through the uplink, the terminal can transmit the above information through normal uplink transmission. Thus, in this case, the terminal transmits, to the base station, a scheduling request instead of an emergency URLLC uplink signal. Alternatively, if the terminal requires uplink data transmission through uplink allocation, the terminal transmits, to the base station, a scheduling request instead of an emergency URLLC uplink transmission signal. If the terminal requires uplink data transmission without uplink allocation, the terminal may transmit, to the base station, an emergency URLLC uplink transmission signal.

Next, a method of supporting the operation of another service in the case where an emergency URLLC service is supported in a dynamic TDD will be described with reference to FIG. 13.

Figure 13:
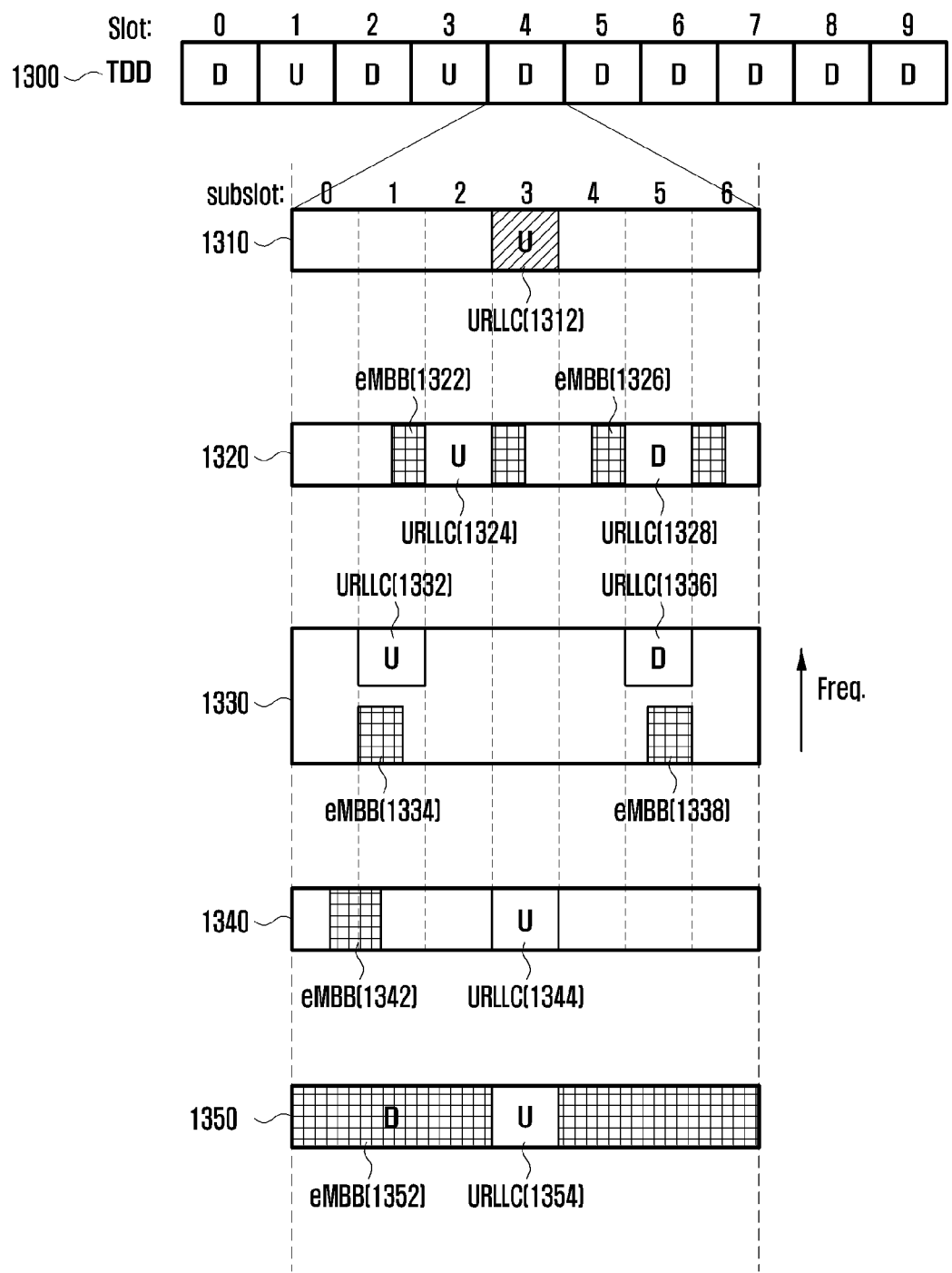
FIG. 13 is a diagram illustrating a second embodiment of operating another service in the situation in which an emergency URLLC service is supported in a TDD.

FIG. 13 is a diagram illustrating a second embodiment of operating another service in the case where an emergency URLLC service is supported in a TDD.

The dynamic TDD transmission in FIG. 13 means operating subframes that can dynamically switch to uplink/downlink subframes, and follows the method described in FIGS. 5 and 6. The base station may transmit a dynamic TDD transmission configuration to the terminal using a higher layer signaling, and the terminal, upon receiving the higher layer signaling, recognizes that the subframes can dynamically switch to uplink/downlink subframes according to the dynamic TDD transmission and performs decoding for common and dedicated downlink control channels according thereto. If the higher layer signaling is not configured, the terminal determines the positions of the uplink/downlink subframes according to the uplink/downlink configuration set by the SIBs and performs decoding for common and downlink control channels in the downlink subframes.

The emergency URLLC transmission is a service that requires an ultra-low latency requirement. The base station may provide the URLLC terminal with an emergency URLLC transmission configuration according to the ultra-low latency requirement by means of a higher layer signaling, and the URLLC terminal, upon receiving the higher layer signaling, may perform operations according to the emergency URLLC transmission/reception. If the higher layer signaling is not configured, the URLLC terminal may perform normal data transmission/reception with respect to the base station.

In FIG. 13, TDD 1300 information (such as carrier frequency bandwidth and location information or the like) may be transmitted from the 5G base station to the 5G-capable terminal. The 5G-capable terminal may obtain the above information through synchronization acquisition and reception of essential system information from the TDD cell in the case where the TDD cell is a standalone cell or from another cell in the case where the TDD cell is not a standalone cell. The 5G-capable terminal attempts to obtain synchronization and essential system information, obtains random access-related information through the received essential system information, and attempts random access to the TDD cell or another cell.

If the TDD cell 1300 supports both the eMBB service and the URLLC service, data transmission/reception for the eMBB service is conducted by means of slots, and data transmission/reception for the URLLC service is conducted on the basis of slots or subslots (or mini-slots). The slot may include 7 or 14 OFDM symbols, and the subslot (or mini-slot) may include fewer OFDM symbols than the slot. Since the subslot includes fewer OFDM symbols than the slot, it is suitable to satisfy the ultra-low latency requirement. The number of OFDM symbols in the slot or the subslot may be defined in the standard for each subcarrier interval, or various numbers may be defined and transmitted to the terminal from the base station using a higher layer signaling or system information. The terminal may receive the higher layer signaling or the system information to thus obtain the number and length of OFDM symbols of the slot or sub slot.

Reference numerals 1310 to 1350 illustrate an example in which emergency URLLC uplink transmission is performed from the terminal to the URLLC base station in a specific slot and in which emergency URLLC downlink transmission is performed from the base station to the URLLC terminal. The method by which the emergency URLLC uplink transmission occurs in the terminal and information thereon is transmitted to the base station follows the method described in connection with FIG. 12. Since the slot in which the URLLC transmission is to be performed may be determined as a downlink slot before the emergency URLLC uplink transmission occurs, it is possible to schedule the downlink data transmission of the eMBB terminal in the previous downlink slot. In addition, the slot may be a valid slot for measuring channel information. However, in the case where an emergency uplink URLLC transmission occurs in the base station and is to be transmitted in the slot, the base station must switch the slot from the downlink to the uplink, thereby enabling the emergency uplink URLLC transmission. Thus, the above-described eMBB downlink transmission scheduled in the previous slot cannot be performed in the corresponding slot, so that the corresponding slot is no longer valid for channel information measurement. Therefore, the disclosure proposes a solution to the problem in which the validity of the slot for the eMBB downlink transmission or the channel information measurement is impossible or is no longer effective due to the emergency uplink URLLC transmission.

In the case where a specific slot must switch from the downlink to the uplink due to the emergency URLLC uplink transmission, the base station may transmit a slot switch signal to all terminals in the cell through a common downlink control channel. Alternatively, the base station may transmit a slot switch signal to specific terminals, which must perform the eMBB downlink transmission in the slot, through dedicated downlink control channels. Alternatively, the base station may transmit downlink reception indication information indicating whether or not an eMBB downlink reception operation can still be performed to the terminals, which must perform the eMBB downlink reception operation in the slot, through a common or dedicated downlink control channel. The slot switch signal includes information indicating that the slot has switched to the uplink or the downlink. The eMBB terminal, upon receiving the downlink reception indication information or the slot switch signal, operates according to the method proposed in the disclosure. The operation of the terminal will be described with reference to reference numerals 1320 to 1350.

Reference numeral 1320 shows a diagram describing, in the case where the eMBB terminal measures channel information in downlink slot 4, operations of determining whether or not the slot is valid for the channel information measurement and measuring the channel information according thereto. In addition, the reference numeral 1320 denotes an example in which the eMBB terminal supports a URLLC function or an example in which the eMBB terminal receives an indication for the URLLC transmission resources or downlink reception indication information. The indication for the URLLC transmission resources includes information on emergency URLLC transmission resources for transmitting data within the maximum latency time that the URLLC must satisfy, such as URLLC transmission frequency resources, time resources, a resource configuration period, or the like. The downlink reception indication information instructs the eMBB terminal as to whether or not to perform the downlink reception operation scheduled or configured in the previous slot in the case where a plurality of URLLC transmissions are performed. For example, downlink reception indication information of 1 bit may be configured such that 0 indicates that the downlink reception must not be performed and 1 indicates that the downlink reception can be performed. Therefore, the operation described in the embodiment may be applied to the case where the terminal supporting the eMBB and the URLLC receives a higher layer signaling for setting the emergency URLLC as described above, the case where the eMBB terminal receives an indication for the URLLC transmission resources, or the case where the eMBB terminal receives downlink reception indication information. The indication for the URLLC transmission resources or the downlink reception indication information may be transmitted from the base station through a higher layer signaling or common and/or dedicated downlink control channels at the time of the emergency URLLC transmission or after the emergency URLLC transmission, and the eMBB terminal may receive the indication.

The first proposal for the eMBB terminal operation is as follows. In 1320, the eMBB terminal receives a slot switch signal from the base station and determines that the downlink slot has switched to an uplink slot. Thereafter, the eMBB terminal receives an indication for an emergency uplink URLLC transmission resource 1324 or an emergency URLLC uplink transmission resource, and if the received URLLC transmission resource 1324 overlaps a reference signal resource 1322 for channel information measurement, the terminal determines that the slot is not valid for channel information measurement and does not perform the channel information measurement in the slot.

If the terminal receives an indication for an emergency uplink URLLC transmission resource 1332 or an emergency URLLC uplink transmission resource, as in 1330, and if the received URLLC transmission resource 1332 does not overlap a reference signal resource 1334 for channel information measurement (the case where the URLLC resource and the reference signal are separated from each other on the frequency), the terminal determines that the slot is valid for channel information measurement and performs the channel information measurement in the slot.

In addition, if the terminal receives an indication for an emergency uplink URLLC transmission resource 1344 or an emergency URLLC uplink transmission resource as in 1340, and if the received URLLC transmission resource 1344 does not overlap a reference signal resource 1342 for channel information measurement (the case where the URLLC resource and the reference signal are separated from each other in time), the terminal determines that the slot is valid for channel information measurement and performs channel information measurement in the slot.

The second proposal for the operation of the eMBB terminal is as follows. The terminal receives an emergency URLLC downlink control channel 1328 or an indication for the emergency URLLC downlink transmission resource in downlink slot 4, and if the received transmission resource of URLLC data 1328 overlaps a reference signal resource 1326 for channel information measurement, the terminal determines that the slot is not valid for channel information measurement. If the terminal receives an emergency URLLC downlink control channel 1336 or an indication for the emergency URLLC downlink transmission resource as in 1330, and if the received emergency downlink URLLC transmission resource 1336 does not overlap a reference signal resource 1338 for channel information measurement (the case where the URLLC resource and the reference signal are separated from each other according to frequency), the terminal determines that the slot is valid for channel information measurement and performs channel information measurement in the slot.

In 1350, the eMBB terminal receives a slot switch signal from the base station and determines that the downlink slot has switched to the uplink slot. The eMBB terminal does not receive multi-slot-scheduled downlink data 1352 during K slots in the previous downlink slot. The URLLC terminal performs emergency URLLC uplink transmission 1354 in subslot 3. Thus, the base station performs the transmission uncounted (i.e., unperformed) due to the emergency URLLC uplink transmission in the nearest downlink slot, thereby completing multi-slot data transmission during K slots. The eMBB terminal receives the downlink data in the nearest downlink slot to thus complete multi-slot data reception during K slots.

Although FIG. 13 has described the embodiment of the downlink reception indication information instructing the eMBB terminal to perform or not to perform the downlink reception operation previously configured or scheduled by means of a higher layer signaling or a physical signal in the case of the eMBB transmission and the URLLC transmission in the TDD cell 1300, the embodiment can be applied to the FDD cell. That is, downlink reception indication information instructing the eMBB terminal to perform or not to perform the downlink reception in the downlink carrier of the FDD cell, which is configured or scheduled to the eMBB terminal by the transmission of a higher layer signaling or a physical signal in the downlink carrier of the FDD cell, may be transmitted to the eMBB terminal through a physical signal in the downlink carrier of the FDD cell. If the eMBB terminal receives the downlink reception indication information in the downlink carrier of the FDD cell, the eMBB terminal may, or may not, perform the downlink reception operation in the downlink carrier of the FDD cell, which is previously configured or scheduled to the eMBB terminal by the transmission of a higher layer signaling or a physical signal, according to the indication of the received downlink reception indication information. Next, FIG. 14 is a diagram illustrating a base station device according to the disclosure.

Figure 14:
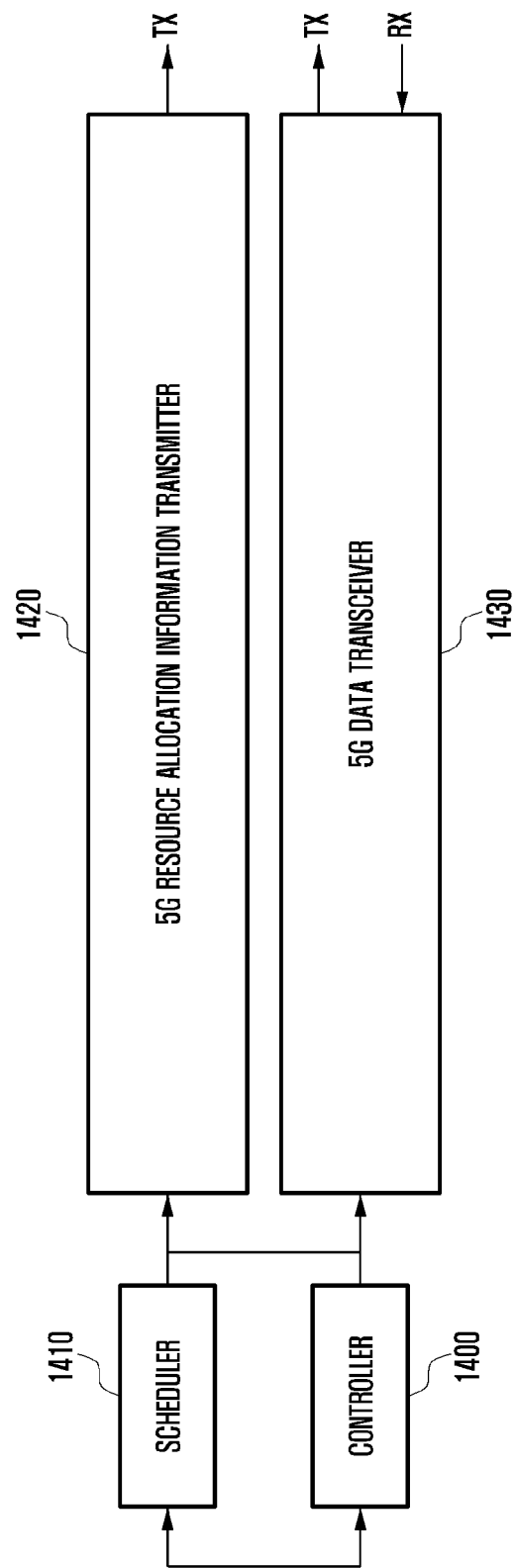
FIG. 14 is a diagram illustrating a base station device according to the disclosure.

According to FIG. 14, a controller 1400 controls 5G resource allocation according to the procedure of the base station as shown in FIGS. 7A and 10A of the disclosure, according to the TDD operation method for each type of subframe and forward compatibility subframe operation method for each type of subframe as shown in FIGS. 5, 6, 8, and 9 of the disclosure, or according to the method of supporting the eMBB terminal in the case where an emergency URLLC service is supported as shown in FIGS. 11, 12, and 13; a 5G resource allocation information transmitter 1420 transmits the same to the terminal; a scheduler 1410 schedules 5G data in the 5G resources; and the 5G data is transmitted to/received from the 5G terminal through a 5G data transceiver 1430.

Figure 15:
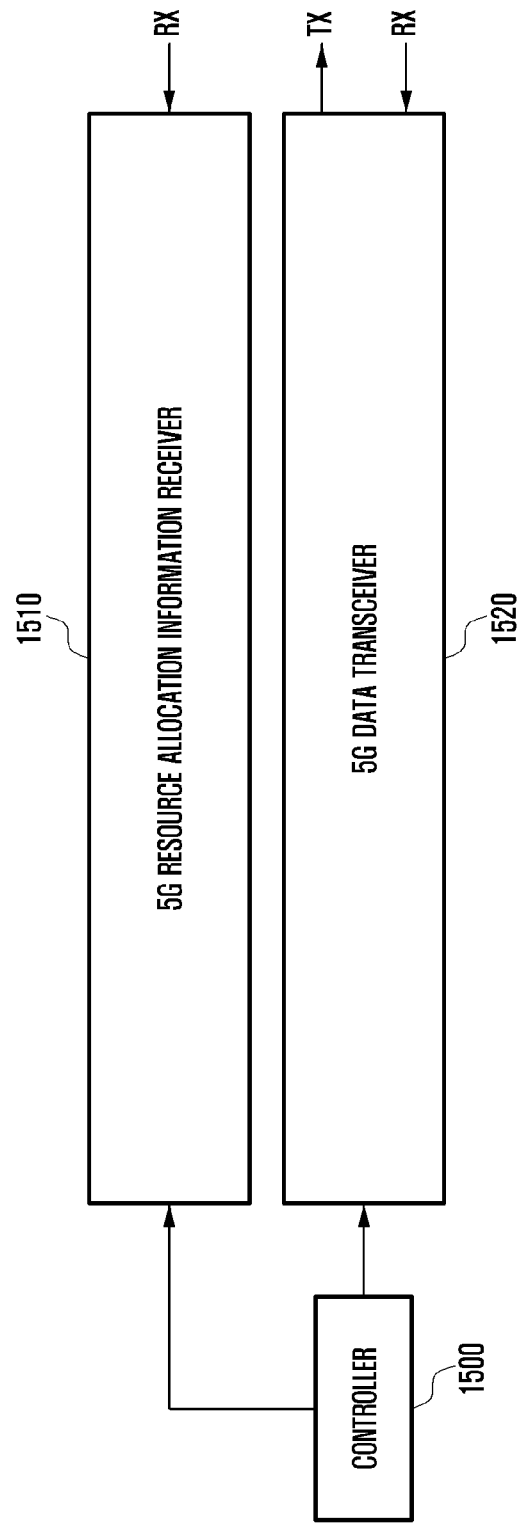
FIG. 15 is a diagram illustrating a terminal device according to the disclosure.

Next, FIG. 15 is a diagram illustrating a terminal device according to the disclosure.

A 5G resource allocation information receiver 1510 receives 5G resource allocation from the base station according to the procedure of the terminal as shown in FIGS. 7B and 10B of the disclosure, according to the TDD operation method for each type of subframe and forward compatibility subframe operation method for each type of subframe as shown in FIGS. 5, 6, 8, and 9 of the disclosure, or according to the method of supporting the eMBB terminal in the case where an emergency URLLC service is supported as shown in FIGS. 11, 12, and 13, and a controller 1500 transmits/receives 5G data scheduled in the allocated 5G resources to/from the 5G base station through a 5G data transceiver 1520.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

What is claimed is:

1. A method performed by a terminal in a communication system, the method comprising:
identifying configuration information on a plurality of logical channel identifiers;
identifying a resource for transmitting a scheduling request of uplink data to be transmitted, based on a logical channel identifier for the uplink data; and
transmitting, to a base station, based on the identified resource, the scheduling request of the uplink data for requesting an uplink scheduling for the uplink data.

2. The method of claim 1, further comprising:
receiving, from the base station, information for the uplink scheduling for the uplink data; and
transmitting, to the base station, the uplink data based on the information for the uplink scheduling.

3. The method of claim 1, wherein the logical channel identifier is associated with a service type of the uplink data.

4. The method of claim 3, wherein the service type of the uplink data includes an ultra-reliable and low latency communications (URLLC) service.

5. The method of claim 1, wherein the configuration information is identified based on higher layer signaling.

6. A method performed by a base station in a communication system, the method comprising:
identifying configuration information on a plurality of logical channel identifiers; and
receiving, from a terminal, a scheduling request for requesting an uplink scheduling for uplink data,
wherein a resource for receiving the scheduling request for requesting the uplink scheduling for the uplink data is associated with a logical channel identifier of the uplink data.

7. The method of claim 6, further comprising:
transmitting, to the terminal, information for the uplink scheduling for the uplink data; and
receiving, from the terminal, the uplink data.

8. The method of claim 6, wherein the logical channel identifier is associated with a service type of the uplink data.

9. The method of claim 8, wherein the service type of the uplink data includes an ultra-reliable and low latency communications (URLLC) service.

10. The method of claim 6, wherein the configuration information is transmitted via higher layer signaling.

11. A terminal in a communication system, the terminal comprising:
a transceiver; and
a controller configured to:
identify configuration information on a plurality of logical channel identifiers,
identify a resource for transmitting a scheduling request of uplink data to be transmitted, based on a logical channel identifier for the uplink data, and
transmit, to a base station, based on the identified resource, the scheduling request of the uplink data for requesting an uplink scheduling for the uplink data.

12. The terminal of claim 11, wherein the controller is further configured to:
receive, from the base station, information for the uplink scheduling for the uplink data, and
transmit, to the base station, the uplink data based on the information for the uplink scheduling.

13. The terminal of claim 11, wherein the logical channel identifier is associated with a service type of the uplink data.

14. The terminal of claim 13, wherein the service type of the uplink data includes an ultra-reliable and low latency communications (URLLC) service.

15. The terminal of claim 11, wherein the configuration information is identified based on higher layer signaling.

16. A base station in a communication system, the base station comprising:
a transceiver; and
a controller configured to:
identify configuration information on a plurality of logical channel identifiers, and
receive, from a terminal, a scheduling request for requesting an uplink scheduling for uplink data,
wherein a resource for receiving the scheduling request for requesting the uplink scheduling for the uplink data is associated with a logical channel identifier of the uplink data.

17. The base station of claim 16, wherein the controller is further configured to:
transmit, to the terminal, information for the uplink scheduling for the uplink data, and
receive, from the terminal, the uplink data.

18. The base station of claim 16, wherein the logical channel identifier is associated with a service type of the uplink data.

19. The base station of claim 18, wherein the service type of the uplink data includes an ultra-reliable and low latency communications (URLLC) service.

20. The base station of claim 16, wherein the configuration information is transmitted via higher layer signaling.

* * * * *